US008824772B2

United States Patent
Viera et al.

(10) Patent No.: US 8,824,772 B2
(45) Date of Patent: Sep. 2, 2014

(54) SYSTEM AND METHOD FOR IMPROVED REMOTE DEPOSIT IMAGE HANDLING

(71) Applicant: Ensenta Inc., Redwood Shores, CA (US)

(72) Inventors: Edward Viera, Redwood City, CA (US); Richard Klein, Lafayette, CA (US); Jim Ballagh, Long Beach, CA (US); Teddy Usman, San Francisco, CA (US); Dmitri Boudtchenko, Palo Alto, CA (US); Crystal Carroll, San Leandro, CA (US); Paulo dos Santos, Mountain View, CA (US); Rajini Jagathesan, Milpitas, CA (US); Chaitanya Mittipelli, Fremont, CA (US); Nhan Phan, Union City, CA (US); Sharmila Pusarla, San Jose, CA (US)

(73) Assignee: Ensenta Inc., Redwood Shores, CA (US)

( * ) Notice: Subject to any disclaimer, the term of this patent is extended or adjusted under 35 U.S.C. 154(b) by 141 days.

(21) Appl. No.: 13/658,584

(22) Filed: Oct. 23, 2012

(65) Prior Publication Data
US 2014/0112571 A1   Apr. 24, 2014

(51) Int. Cl.
*G06Q 40/00*   (2012.01)
*G06K 9/00*   (2006.01)

(52) U.S. Cl.
USPC .......................................... 382/137; 705/42

(58) Field of Classification Search
USPC ................................ 382/141–152, 137–140
See application file for complete search history.

(56) References Cited

U.S. PATENT DOCUMENTS

| | | | | |
|---|---|---|---|---|
| 5,678,046 | A | * | 10/1997 | Cahill et al. ............... 707/829 |
| 5,748,755 | A | * | 5/1998 | Johnson et al. ............ 382/115 |
| 5,751,849 | A | * | 5/1998 | Ikeda ......................... 382/176 |
| 2001/0014176 | A1 | * | 8/2001 | Kamada et al. ............ 382/181 |
| 2002/0136462 | A1 | * | 9/2002 | Hebert, Jr. .................. 382/246 |
| 2005/0091163 | A1 | * | 4/2005 | Phillips et al. ............... 705/45 |
| 2005/0219616 | A1 | * | 10/2005 | Furuta et al. ............... 358/1.18 |
| 2006/0180657 | A1 | * | 8/2006 | Phillips et al. ............. 235/379 |
| 2008/0101680 | A1 | * | 5/2008 | Abernethy et al. ......... 382/139 |
| 2009/0018960 | A1 | * | 1/2009 | Gawne ......................... 705/45 |
| 2009/0171800 | A1 | * | 7/2009 | Phillips et al. ............... 705/21 |
| 2012/0230577 | A1 | * | 9/2012 | Calman et al. ............. 382/138 |

* cited by examiner

*Primary Examiner* — Alex Liew
(74) *Attorney, Agent, or Firm* — Fountainhead Law Group, P.C.

(57) ABSTRACT

Improved systems and methods for detecting and correcting image errors and risks in remote deposit systems during an in-line or in-process troubleshooting session are disclosed. Various embodiments include systems for displaying remote deposit session data to a support technician with links for invoking an image display or image editor user interface during a troubleshooting session. The links can be included in one or more individual remote deposit session events, records, or tasks, such as check image uploads and bi-tonalization events. The image editor can be used to manually or automatically correct any detected errors or flaws in uploaded or processed deposit document images. The corrected check images can be then be stored and used to complete or reprocess a remote deposit.

20 Claims, 19 Drawing Sheets

SYSTEM AND METHOD FOR IMPROVED REMOTE DEPOSIT IMAGE HANDLING

CROSS REFERENCE TO RELATED APPLICATIONS

Not applicable

BACKGROUND

The present invention relates to processing financial transactions, and in particular, to systems and methods for correcting, validating, and digitally endorsing deposit images for remote image capture deposits.

Unless otherwise indicated herein, the approaches described in this section are not prior art to the claims in this application and are not admitted to be prior art by inclusion in this section.

To increase the convenience and speed of using existing and legacy checking systems and checks, many banks and other service providers have implemented various types of remote deposit systems. In such systems, a user can associate a deposit or checking account with a particular remote deposit system. That user can then deposit checks or other physical deposit documents into the associated account without taking or sending the physical document to the financial institution that services the account. Instead of taking the deposit document or sending the deposit document to the physical location of the bank or other financial institution servicing the account, a user need only capture an image of the front and back of the deposit document written to the user or the user's business. Such images of the front and back of the deposit documents are typically captured in a digital format using a scanner or digital camera. The user, or a system or device controlled by the user, can send the digital images of the deposit document directly to a remote deposit processor, or an intermediate entity, via one or more electronic communication media, i.e. the Internet, for processing.

When the remote deposit processor, or other financial transaction processor, such as financial transaction network, receives the images of the deposit document it typically performs various types of image analysis and data processing. For example, to extract any information from the digital image of the deposit document, most systems first perform optical character recognition (OCR) on the deposit document. The OCR converts the data embedded in the image of the deposit document into ASCII or binary code that can be read by a computer system. Typical OCR processes extract the name of the payee, the amount of the payments, the account and routing number information, the date, and any other information that might be printed or written on the front or back of the deposit document. Some remote deposit systems use the same OCR process to detect a signature, while others use a separate module or service to determine whether or not there is a semblance of a valid signature.

Because such remote deposit systems rely heavily, if not solely, on the information they can decipher from the digital image of a deposit document, it is important that the image of the deposit document be in focus and have sufficient resolution and contrast that the information can be accurately determined. However, due to the myriad ways that a user can capture a digital image of a deposit document, i.e. digital camera, scanner, camera phone, etc., the size, resolution, alignment, orientation, and quality of the various deposit document received from various users can vary dramatically. Even in situations where the deposit document is legitimate, and includes all the requisite information, including a signature, various image quality issues can cause errors in the recognition process that would prevent typical remote deposit systems from deciphering or validating the necessary information from the image of the deposit document. In some remote deposit systems, a color or grayscale image of the deposit document, due to regulatory or system requirements, is converted into a bi-tonal, i.e. black and white digital image, to increase the contrast and to reduce the file size of the image of the deposit document to be stored and sent to other agencies or regulators. When the digital image of the deposit document is converted to a bi-tonal image, some or all the information can be lost. This is particularly problematic in digital images of deposit documents that have low contrast or low-resolution.

When a digital image of a deposit document is received in, or processed into, such a condition that it cannot be deciphered or validated, i.e. the account or routing number is not legible, or a signature cannot be detected, typical remote deposit systems will reject the deposit. Most banks will reject the deposit because the omission of necessary information from the digital image can not only prevent the remote deposit system from properly processing or handling the deposit, it can also be an indication that the deposit document is fraudulent.

A rejection of the deposit causes the deposit document to be returned. A returned deposit document can cause many undesirable consequences. For example, the amount of the deposit document written to the payee will not be deposited into the payee's account. In the case that the deposit is already made to the payee account, the payer's bank and the payee's bank must coordinate to transfer the deposit out of the payee's account back to the payer's account. Not only do such procedures cause delays, they can also costs the payee and the payer and their associated banks money. For example, the person who wrote a check, depending on the type checking account they have, may be assessed a fee for the returned check.

Additionally, a failure of a remote deposit system can lead to user dissatisfaction and mistrust of the system, such that the user will be hesitant to use such a remote deposit system. If users are hesitant to use a remote deposit system due to inconvenience, wasted time, and extra expense, then there is little chance that such a remote deposit system will be successful in the marketplace.

Thus, there is a need for improved handling of issues and exceptions caused by poor quality image capture or image processing in remote deposit systems. The present invention solves these and other problems by providing systems and methods for improved remote deposit image handling and an deposit document image related troubleshooting and administration.

SUMMARY

Embodiments of the present invention improve systems and method for processing and troubleshooting remote deposits In one embodiment, the present invention includes a method that can include receiving, in a computer system, a request for data associated with a particular remote deposit session from a user during a troubleshooting session and retrieving in response to the request, remote deposit session data associated with the particular remote deposit session from a data store. Such methods can also include displaying, on a display device of the computer system, a first user interface comprising the remote deposit session data and embedded controls. Related embodiments can also include receiving, through the embedded controls, a request for a deposit document image associated with the remote deposit session data, retrieving, in response to the request, deposit document image data from the data store and displaying the deposit document image based on the deposit document image data in a second user interface, wherein the second user interface can include image editing controls. Such embodiments can also include editing, in response to user input received through the image editing controls, the deposit document image to create an edited deposit document image and saving the edited deposit document image as edited deposit document image data to the data store. Once the edited deposit document image is save, related embodiments can also include processing the edited deposit document image data, in response to embedded controls of the first user interface.

In some embodiments, the deposit document image data can include data received from a remote capture device during the remote deposit session.

In other embodiments, the deposit document image data can include an error that prevents completion of the remote deposit session.

In one embodiment, processing the edited deposit document image data can include determining deposit information from the edited deposit document image data.

In related embodiments, determining deposit information from the edited deposit document image data can include performing an optical character recognition (OCR) function on the edited deposit document image data.

In other embodiments, the second user interface further comprises controls for accessing a related deposit document image associated with the remote deposit session data. In related embodiments, the deposit document image comprises an image of a first side of a deposit document associated with the particular remote deposit session or a second side of the deposit document.

Some embodiments of the present invention can include a non-transitory computer readable medium that can include computer readable code that when executed on a processor of a computer system causes the processor to receive a request for data associated with a particular remote deposit session from a user during a troubleshooting session, retrieve, in response to the request, remote deposit session data associated with the particular remote deposit session from a data store, display, on a display device of the computer system, a first user interface comprising the remote deposit session data and embedded controls, receive, through the embedded controls, a request for a deposit document image associated with the remote deposit session data, retrieve, in response to the request for the deposit document image, deposit document image data from the data store, display, on the display device, the deposit document image based on the deposit document image data in a second user interface, wherein the second user interface comprises image editing controls, editing, in response to input received through the image editing controls, the deposit document image to create an edited deposit document image, save the edited deposit document image as edited deposit document image data to the data store, and process, the edited deposit document image data, in the computer system, in response to embedded controls of the first user interface. In related embodiments, the deposit document image data can include data received from a remote capture device during the remote deposit session. In other embodiments, the deposit document image data can include an error that prevents completion of the remote deposit session.

In some embodiments, the non-transitory computer readable medium can include computer readable code that causes the processor to process the edited deposit document image data further comprises computer readable code to cause the processor to determine deposit information from the edited deposit document image data. In related embodiments, the computer readable code that causes the processor to determine deposit information from the edited deposit document image data can also include computer readable code that causes the processor to perform an optical character recognition (OCR) function on the edited deposit document image data.

In other embodiments, the second user interface further can include controls for accessing a related deposit document image associated with the remote deposit session data. In related embodiments, the related deposit document image comprises an image of a first side of a deposit document associated with the particular remote deposit session or a second side of the deposit document.

Some embodiments of the present invention can include a system having a deposit data verifier, a deposit image editor coupled to deposit data verifier, and a deposit event data store coupled to the deposit data verifier and the deposit image editor. In such embodiments, the deposit data verifier can receive a request for data associated with a particular remote deposit session from a user during a troubleshooting session, retrieve, in response to the request, remote deposit session data associated with the particular remote deposit session from a deposit event data store, display, on a display device, a first user interface comprising the remote deposit session data and embedded controls, receives, through the embedded controls, a request for a deposit document image associated with the remote deposit session data, retrieve, in response to the request for the deposit document image, deposit document image data from the deposit event data store, and display, on the display device, the deposit document image based on the deposit document image data in a second user interface. In such embodiments, the second user interface can include image editing controls. The deposit image editor, in response to input received through the image editing controls, can edit the deposit document image to create an edited deposit document image and save the edited deposit document image as edited deposit document image data to the deposit event data store. In such embodiments, the deposit data verifier can process the edited deposit document image data, in response to embedded controls of the first user interface.

In other embodiments, the deposit document image data can include data received from a remote capture device during the remote deposit session.

In yet other embodiments, the deposit document image data can include an error that prevents completion of the remote deposit session.

In some embodiments, the deposit data verifier can determine deposit information from the edited deposit document image data.

In one embodiment, the second user interface further can include controls for accessing a related deposit document image associated with the remote deposit session data. In such embodiments, the related deposit document image can include an image of a first side of a deposit document associated with the particular remote deposit session or a second side of the deposit document. For example, the front side and backside of a check.

The following detailed description and accompanying drawings provide a better understanding of the nature and advantages of the present invention.

DETAILED DESCRIPTION

Figure 1A:
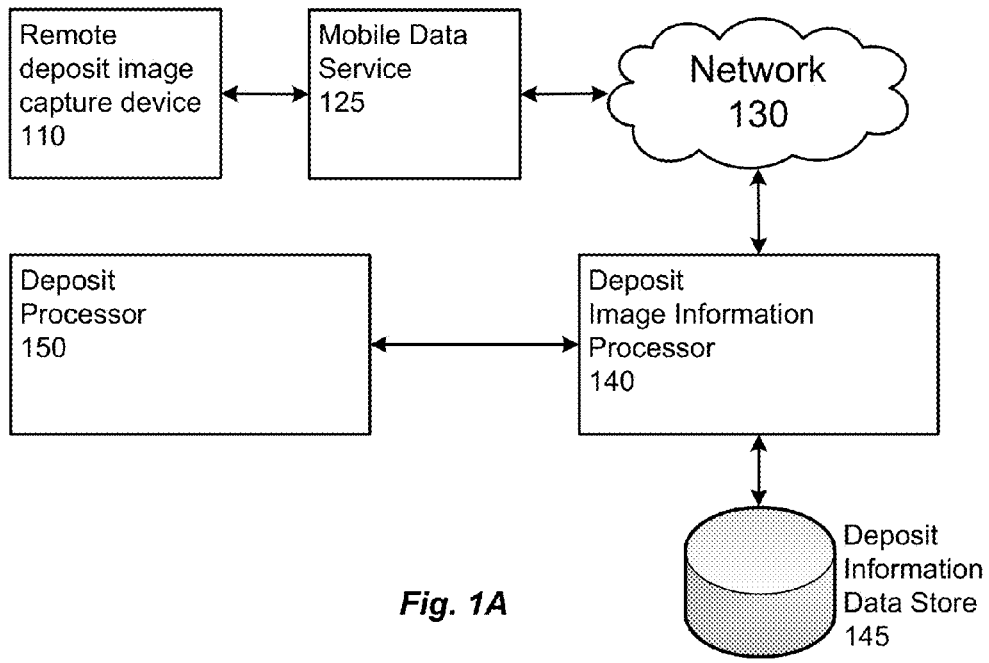
FIGS. 1A and 1B illustrates a simplified schematic the remote deposit systems according to embodiments of the present invention.

Described herein are techniques for systems and methods for handling exceptions and errors caused by imaging or processing defects in remote deposit processing systems, i.e. remote check deposit systems. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Various embodiments of the present invention include systems and methods for handling image capture and image processing errors detected during or after a remote deposit processing session. In remote deposit processing systems, users of various types of computing and imaging devices can capture an images of a paper check or other payment deposit document. Using such devices, users can send images of the deposit documents through one or more networks, such as the Internet, to a centralized or distributed remote deposit image verification and processing center or server. Once the deposit image verification processing server receives an image of the deposit document, the image verification processing server processes and analyzes the image of the deposit document to extract various pieces of information, such as routing number, account number, and amount, and verifies that the deposit document is authorized, i.e. that the check image includes an authorized signature. However, due to differences between imaging devices and conditions used to capture images of deposit documents, the quality of images and the available information from the image can vary drastically from user to user, from computing device to computing device, and from image capture device to image capture device.

If the captured image received by the central image verification and processing server is of sufficient quality, such that all requisite information can be determined and verified, then there are no issues and the deposit can be processed normally. However, in scenarios in which the quality of the image of the deposit document, either due to poor image capture conditions or ineffective or defective image processing, i.e. bitonalization, processing of the remote deposit cannot be processed or verified. In such scenarios, various embodiments of the present invention can be implemented to determine, correct, and otherwise handle defects or errors in the image of the deposit document or the information determined therefrom.

In such embodiments, each action of the remote deposit session are associated with a remote deposit session identifier. Such steps include logon procedures, authentication procedures, deposit document image upload, deposit image analysis, determination of deposit information, etc. Each action can represent a specific row or record of a table or other relational data structure and be associated with the particular session identifier. In the case of a deposit document image upload step, various embodiments of the present invention can include a link in a user interface operable to execute or instantiate an embedded or external image editing functionality implemented in an application, program, or subroutine.

Figure 1B:
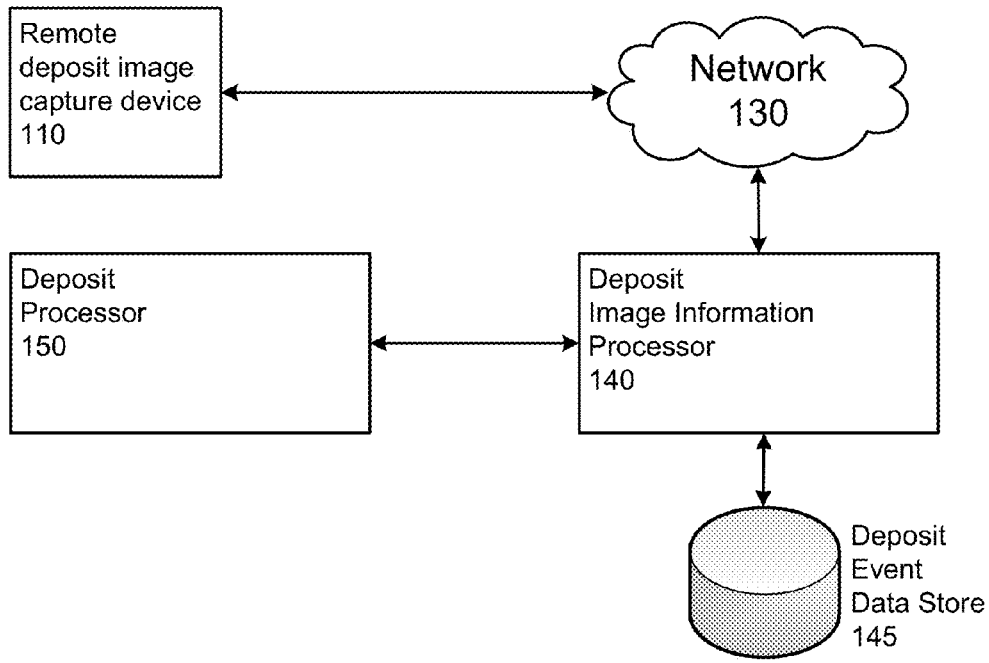

Such image editing functionality can display various versions of the uploaded and/or processed deposit document to a user. In related embodiments, the image editing functionality can include automatic detection or determination of defects or errors in the deposit document. Using the image editing functionality, a user can make corrections and/or change various features of the image of the deposit document to allow other parts of the remote deposit processing system to function accurately or otherwise normally. Any changes or corrections to the image of the deposit document can be saved for future use and or comparison with the original image of the deposit document uploaded by user and/or a computing device controlled by the user. Such embodiments of the present invention provide for faster and more efficient techniques to handle errors caused by defects or exceptions in original or processed deposit document images that can result in higher acceptance rates of deposit document images. Such improvements increase the number of successful remote deposit sessions, thus decreasing the cost associated with processing remote deposits, as well as improving user experience, thus increasing the likelihood a user will continue to use such remote deposit services FIGS. 1A and 1B illustrate two simplified schematics of systems 100A and 100B for receiving and processing remote deposits according to various embodiments of the present invention. System 100A is a system according to various embodiments of the present invention that can be implemented using mobile wireless technologies. System 100B is a system according to other various embodiments of the present invention that can be implemented using various wired and wireless networks.

As shown in FIG. 1A, a remote deposit image capture device 110, such as a smart phone, camera phone, PDA, tablet computer, laptop computer, or other mobile computing device that includes an imaging device, such as a camera or scanner, can be coupled wirelessly via various types of wireless communication protocols to mobile data service 125. For example, remote deposit image capture device 110 can include a smart phone with a built-in camera that is activated to communicate wirelessly with mobile data service 125. Remote deposit image capture device 110 can communicate with mobile data service 125 over various types of data communication standards, such as GPRS, Edge, 3G, 4G, 4G LTE, and other wireless communication standards over one or more electronic wireless communication media.

In some embodiments, the remote deposit image capture device 110 can capture an image of a check, or other deposit document, and send it via one or more wireless communication media through mobile data service 125 and network 130 to deposit image information processor 140. In related embodiments, remote deposit image capture device 110 can capture the image of the deposit document using an application, widget, app, or other such executable code provided by or specific to deposit image information processor 140. In such embodiments, the executable code can include instructions for authenticating an authorized user, i.e. confirming a username and password or pin, or performing various types of biometric authentication, to prevent unauthorized use of remote deposit image capture device 110.

In related embodiments, remote deposit image capture device 110, and or executable code run by the remote deposit image capture device 110, can encrypt, scramble, or otherwise encode remote deposit data sent from remote deposit image capture device 110 to deposit image information processor 140 to secure the data from unintended interception by potential fraudsters. Such remote deposit data can include the raw or processed images of the deposit document as well as user authentication data.

Deposit image information processor 140, can receive the remote deposit data and or the user authentication data from remote deposit image capture device 110 by the mobile data service 125, and network 130. In some embodiments, mobile data service 125 can include traditional wireless data service providers and network 130 can include the Internet. In related embodiments, a remote deposit data session can include multiple interactive messages sent between deposit image information processor 140 and remote deposit image capture device 110 via mobile data service 125, and network 130. In such embodiments, deposit image information processor 140 can log each message or interaction as a separate remote deposit event.

Each of the separate remote deposit events can include various information collected in a single entry of a table or other relational database record, i.e. a row. Each record can be associated with a remote deposit data session identifier that is created at the beginning of the particular remote deposit data session. Accordingly, each separate remote deposit event can be associated with the remote deposit data session identifier associated with the remote deposit data session during which it occurs. Deposit image information processor 140 can store, retrieve, and update such remote deposit events associated with the remote deposit data session identifier in deposit information, data store 145.

Deposit image information processor 140 can include a number of functions, modules, or components. In some embodiments, deposit image information processor 140 can analyze and process the images of the deposit documents to extract various information for the deposit processor 150 to execute the transfer of funds from one account to another to complete the intended deposit of funds. Deposit processor 150 can include various types of entities, such as banks, credit card account acquirers, credit unions, brokerage firms, stockbrokers, and any other financial institution that handles or processes financial deposits or other transactions.

As shown in FIG. 1B system 100B is similar to system 100A, but omits the use of mobile data service 125. In such embodiments, remote deposit image capture device can include any type of computing device with an attached or integrated image capture device. For example, remote deposit image capture device 110 can include a personal computer, a thin client, a kiosk, a laptop computer, a tablet computer, a smart phone, or other computing device that includes an image capture device, such as a camera or scanner, as well as network interface capabilities to communicate with deposit image information processor 140 over network 130. In such embodiments, the network interface capability of remote deposit image capture device 110 can include a network interface card or device for communicating over Ethernet, IEEE 802.11 wireless protocols, WiMAX, IP, or any other electronic communication medium, protocol, or standard. Similarly deposit image information processor 140 can include a network connection or interface module for communicating with the remote deposit image capture device 110, or the mobile data service 125 of system 100A.

In each of the exemplary embodiments shown in FIGS. 1A and 1B, the deposit image information processor 140 can include various components or modules for performing specific tasks and functions. The deposit image information processor 140 can be implemented using a combination of hardware, firmware, and software. Accordingly, each of the constituent components or modules of can as a combination of hardware, firmware and software. In one exemplary embodiment the present invention, deposit image information processor 140 is a software module defined by computer executable code executed by processor in a server computer connected to one or more networks for communicating with one or more remote deposit image capture devices.

Figure 2:
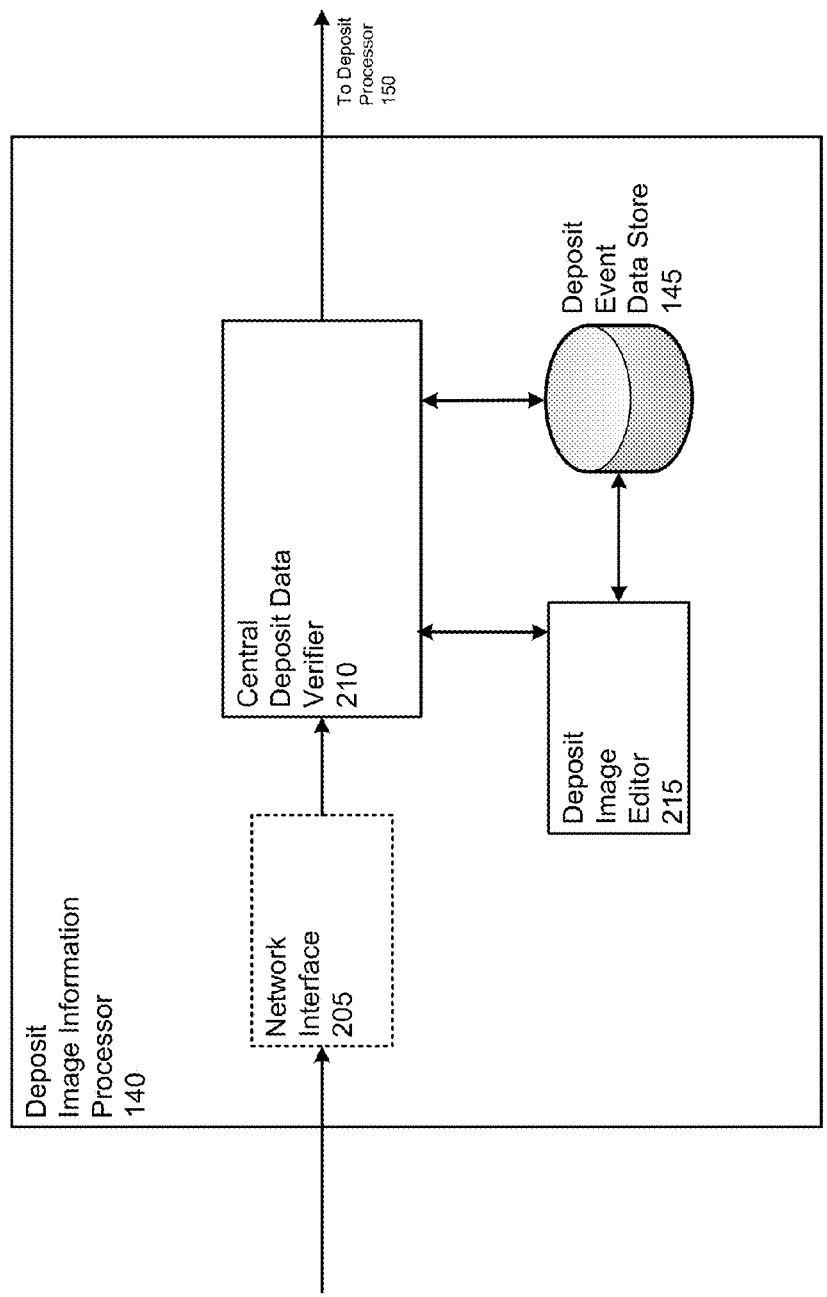
FIG. 2 illustrates a simplified schematic of a deposit image information processor according to various embodiments of the present invention.

FIG. 2 shows a simplified schematic of a deposit image information processor 140 according to various embodiments of the present invention. As shown, deposit image information processor 140 can include a network interface 205 coupled to a central deposit data verifier 210, which is coupled to deposit image editor 215 and deposit event data store 145. Each one of the constituent components or modules of the deposit image information processor 140 can be implemented in software, or combination of hardware and software. Accordingly, each of the connections between the connect constituent parts components or modules can include various types of electronic communication media, including networking communication media, such as Ethernet, and data communication media, i.e. data bus.

In exemplary embodiments, deposit image information processor 140 can be connected to one or more networks by a network interface 205. In other embodiments, in which deposit image information processor 140 is one of multiple internal software modules or components, network interface 205 is optional, and therefore can be omitted. In such scenarios, deposit image information processor 140 can exchange information and data with other software components via common internal or external communication protocol inputs and outputs.

In related embodiments, central deposit data verifier 210 can receive remote deposit session data and perform various functions on the remote deposit session data. The remote deposit session data can include multiple interactive messages and actions required for executing a remote deposit. Each message sent or received by the central deposit data verifier 210, and any other intermediate steps or actions performed by the central deposit data verifier 210 or other component of central deposit image information processor 140, during a specific remote deposit session can be logged as an event or data record and associated with a respective remote deposit session identifier. Central deposit data verifier 210 can store the associated remote deposit events in deposit event data store 145. Deposit event data store 145 can include one or more relational or table-based databases.

In related embodiments, central deposit data verifier 210 can receive deposit document image data. In such embodiments, the deposit document image data can be in various image data file formats, such as JPEG, TIFF, PNG, RAW, GIF, BMP, or any other raster or vector standard or proprietary digital image file format. The central deposit data verifier 210 can analyze and process received deposit document image data. Analyzing, and processing the receive deposit document image data can include performing optical character recognition (OCR) the deposit document image data.

For example, the central deposit data verifier 210 can perform OCR operations on the digital image of a traditional check. In performing the OCR operations on the digital image of the check, the central deposit data verifier 210 can extract the routing number, the account number, the name of the payee, the name of the payer, the amount of the deposit, an image of the authorized signature from the front of the check, as well as an image of the endorsement stamp or signature from the back of the check and any other information the deposit image editor 215 may require. If there are no errors or issues with the extraction of the necessary information from the image of the check, the requisite information can be sent to deposits processor 150 for further processing and/or to execute the deposit represented by the check into the account associated with the user or users that initiated the remote deposit data session.

However, in situations in which the deposit document image data is less than optimal, extracting the requisite information from the image of the deposit document can be complicated or otherwise impeded. For example, the image of a check may be out of focus, have low contrast, be too dark or too bright, have low-resolution, be skewed or distorted, or include some other image defect that might prevent the proper analysis and processing of the image of the check to extract the requisite information to complete the remote deposit. In such embodiments, the central deposit data verifier 210 can flag the error and send an error alert to a user, department, or another module of the deposit image information processor 140 for review and/or correction.

For example, central deposit data verifier 210 can include an alert or error flag in the event record that represents the upload and/or processing of the specific image of a check stored in the deposit event data store 145. The alert or error flag in the deposit event data store 145 can be discovered during a troubleshooting or customer support interaction between a financial institution and a user attempting to make a remote deposit. In such scenarios, the user at the financial institution can log into the deposit image information processor 140 and/or the central deposit data verifier 210 to access the remote deposit data session stored in deposit event data store 145, to view the error or alert flag and the associated information regarding the uploaded check image data. The deposit image editor 215, in accordance with various embodiments of the present invention, can then be invoked.

To invoke the deposit image editor 215, a user can operate a graphical user interface, or other user interface, on the server computer executing the deposit image information processor 140 or a remote client computer connected to the server computer executing the deposit image information processor 140. In some embodiments, the graphical user interface can include a listing of the specific attributes of each event associated with a particular remote deposit data session. In such embodiments, the graphical user interface can include one or more links in one or more deposit event records, such as a hyperlink, operable by a user invoking the deposit image editor 215. The deposit image editor 215 can be invoked during a remote deposit session analysis procedure, or in response to a trouble or issue ticket created by the financial institution or reported by an end-user. Such embodiments are particularly helpful for providing real-time and in-line troubleshooting and user support. A support personnel user can invoke the deposit image editor 215 directly from a remote deposit session record or a specific remote deposit event within a session record.

In some embodiments, the deposit image editor 215 can be invoked to help a customer service representative determine why one of the processes in the remote deposit session encountered an error. For example, the optical character recognition (OCR) or authorized signature determination can fail because the deposit document image provided by the end-user is of insufficient quality, i.e. out of focus, low contrast, distorted, low-resolution, too small, etc. Deposit image editor 215 can be used to manually or automatically detect and/or correct various defects in the deposit document image which can aid in correcting errors in other steps of the remote deposit process.

Deposit image editor 215 can retrieve one or more deposit document images from the deposit event data store 145. The specific deposit document image retrieved from the deposit event data store 145 can be based on a selection made by or determined from a user interaction with a user interface provided by the deposit image information processor 140 or the central deposit data verifier 210. In some embodiments, deposit image editor 215 can instantiate a separate or embedded user interface to provide a user with tools to view, edit, or otherwise manipulate deposit document images from the deposit event data store 145.

Figure 3:
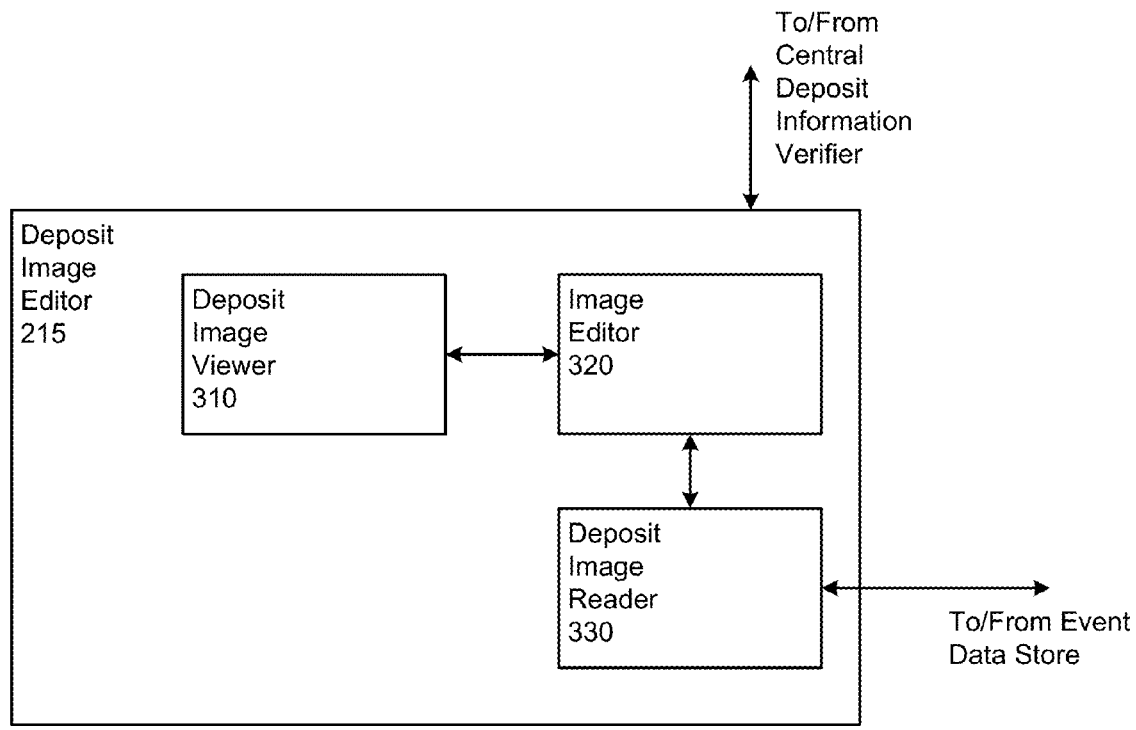
FIG. 3 illustrates a simplified schematic of a deposit image editor according to various embodiments of the present invention.

FIG. 3 is a simplified schematic of a deposit image editor 215 according to various embodiments of the present invention. As shown deposit image editor 215 can include a deposit image reader 330 that can be configured to send queries for specific deposit document image data to one or more event data stores. In some embodiments, the deposit image reader 330 can format or specifically structure the query to match the requirements of a specific event data store. In related embodiments, in response to the queries sent to the one or more event data stores, deposit image reader 330 can receive deposit document image data in one or more image file formats. Deposit image reader 330 can be configured to or include instructions to translate the received deposit document image data from one format to another. For example, the deposit image reader 330 can receive deposit document image data as a RAW file type, and converted into a JPEG file type, or other image file type native to the deposit image editor 215.

The deposit image reader 330 can send the deposit document image data to image editor 320. Image editor 320 can open the deposit image document image data and/or prepare it for display for manual or automatic editing. Deposit image viewer 310 can display a visual representation of the deposit document image data on one or more computer displays or other output devices. For example, deposit image viewer 310 can display the images of the back and front of a particular check that was submitted to the remote deposit system for processing. In such embodiments, the deposit image document data can include the actual deposit document image data as it was captured and uploaded by a remote image capture device. Accordingly, the deposit document image data can include color, grayscale, and black and white image data in a variety of file formats, resolutions, contrast, and sizes. In some embodiments, the deposit image viewer 310 can include controls or links operable by user to display related deposit document image data. While the deposit image viewer 310 is displaying the original deposit document image uploaded by a remote user, the graphical user interface in which the deposit document image is displayed can include links or controls that will retrieve and display the processed versions of the deposit document image used in various other steps in the deposit processing procedure. For example, since various financial institutions and regulators require that images of remote deposit documents be processed and saved into a reduced size file format, i.e. compressed or bi-tonalized, processing the deposit document image data into a compressed a reduced size file format can cause various artifacts in the deposit document image data that can impact various remote deposit processing steps or procedures, such as OCR or signature detection.

By analyzing both the original uploaded deposit document image data and the related processed versions of the deposit document image, a user or the image editor 320 can make corrections or reprocess the deposit document image data to render it suitable for further processing of the remote deposit session. For example, a user using a user interface to control the image editor 320 and deposit image viewer 310 can determine that a particular deposit document image has been overly processed into a black and white image from a grayscale image such that the routing and or account numbers are indecipherable by the remote deposit system. In such scenarios, the user can either manually determine the routing and or account numbers, or the user can apply a less severe or adjusted bi-tonalization process. Once the revised deposit document image data is corrected, the user can save the revised or edited deposit document image data to one or more event data stores. Correcting the deposit document image can include, but is not limited to, automatically or manually de-skewing, resizing, re-cropping, bi-tonalizing, or correcting other deposit document image data defects using one or more internal or external tools included or linked to the image editor 320 and deposit image viewer 310. In such embodiments, the edited deposit document image data can be associated with or linked to the remote deposit session identifier and have a specific remote deposit session event created specifically for the revised deposit document image data.

Figure 4:
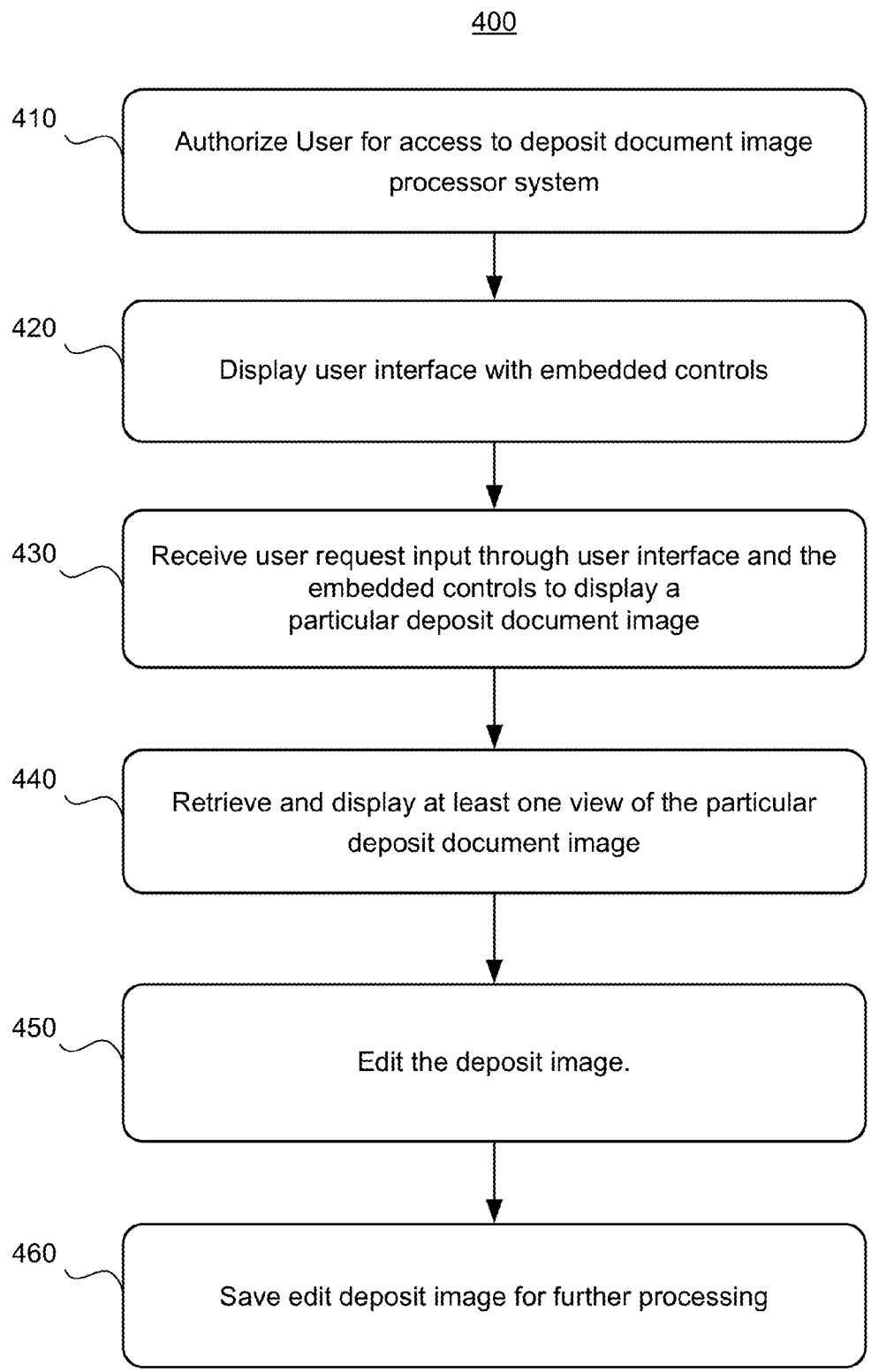
FIG. 4 is a flowchart of a method according to various embodiments of the present invention.

FIG. 4 is a flowchart of a method 400 detecting, determining, and correcting deposit document defects in a remote deposit processor system. Such methods can be included in various type of in-process or in-line troubleshooting session.

Method 400 can begin at action 410 in which a deposit document image processor system can authorizes the user for access to the various resources associated with the deposit document image processor system. In some embodiments, authorizing a user can include accepting a username, a password, an authentication code, an encryption code, a security dongle, a key card, a smart card or other virtual or physical authorization token on a local or remote client or server computer. In related embodiments, deposit document image processor system can be implemented in combination of hardware, firmware, and software, such as a client or server computer.

Once the user is authorized to access the deposit document image processor system, the deposit document image processor system can display one or more user interfaces with embedded controls and displays for viewing, accessing, editing, or otherwise manipulating remote deposit session information associated with particular remote deposit session identifier, in action 420. Such remote deposit session information can include multiple individual records or events with specific attributes that described interactions between the deposit document image processor system, a remote user, a remote image capture or computing device, and other entities or computer systems required in processing of remote deposit transactions. The specific attributes for each individual event or record can include descriptions and names of various pages, subroutines, programs, outputs, error messages, hyperlinks to deposit document image data, execution time stamps, response time stamps, elapsed time, etc.

In action 430, the deposit document image processor system can receive a user request input through the user interface and the embedded controls or links to display a particular deposit document image through the embedded controls. Such user interface and embedded controls can be included, link to, or otherwise associated with an in-line or in-process troubleshooting or user support user interface or dashboard. In some embodiments, the request to display a particular deposit document image can include a remote deposit session identifier associated with particular remote deposit session in which the particular deposit document image was uploaded, processed, or otherwise manipulated or referenced. In related embodiments, the request to display a particular deposit document image can include, but is not limited to, clicking on a text or icon-based hyperlink associated with the remote deposit session identifier associated with the desired particular deposit document image data. Enabling the user support technician direct and real time access to previously received and uploaded deposit document images allow such technicians to determine and correct issues with the deposit document images that might cause errors in the remote deposit process, thus expediting the process and preventing unnecessary returned deposits. Decreasing the time and resources required to process a successful remote deposit decreases costs while increasing remote deposit system user satisfaction.

In response to the user request to display a particular deposit document image, the deposit document image processing system can retrieve the deposit document image data from one or more remote deposit event data stores and display one or more visual representation of the particular deposit document image data requested in the received request, in action 440. In some embodiments, displaying a particular deposit document image can include creating or rendering a new editor or viewing window that displays one or more views of the particular deposit document image. For example, when a hyperlink to a particular uploaded check image is clicked, a new window can be created in a graphical user interface to display both the back and the front of the requested original check image. The newly created window can include controls for correcting image defects in the image of the check check. In related embodiments, various other versions, such as black and white versions, of the particular deposit document image, can be viewed to determine if processing performed by the deposit document image processor system introduced any errors or image defects that might prevent system from collecting or determining information from the deposit document image.

In scenarios in which user support technician or the system determines that there are image defects or other defects in the image data that can prevent the processing of the remote deposit, the user can manually, or the system can automatically, make corrections to one or more versions of particular deposit document image associated with the particular remote deposit session identifier. For example, in action 450, in response to user input received through the user interface and embedded controls of the editing or viewing window, the deposit document image processor system can edit the deposit document image data. In some embodiments, editing the deposit document image data can include automatically or manually correcting various image defects. For example, the original deposit document image can be re-cropped so that the entirety of the front face of the deposit document, i.e. a check can be shown in the deposit document image.

In action 460, edits to various versions of the deposit document image data can be saved to one or more data stores and/or passed on to other modules, systems, and computers for further processing of remote deposit. In some embodiments, saving or passing the edits to the deposit document image data can conclude an in-process or in-line troubleshooting session.

Figure 5:
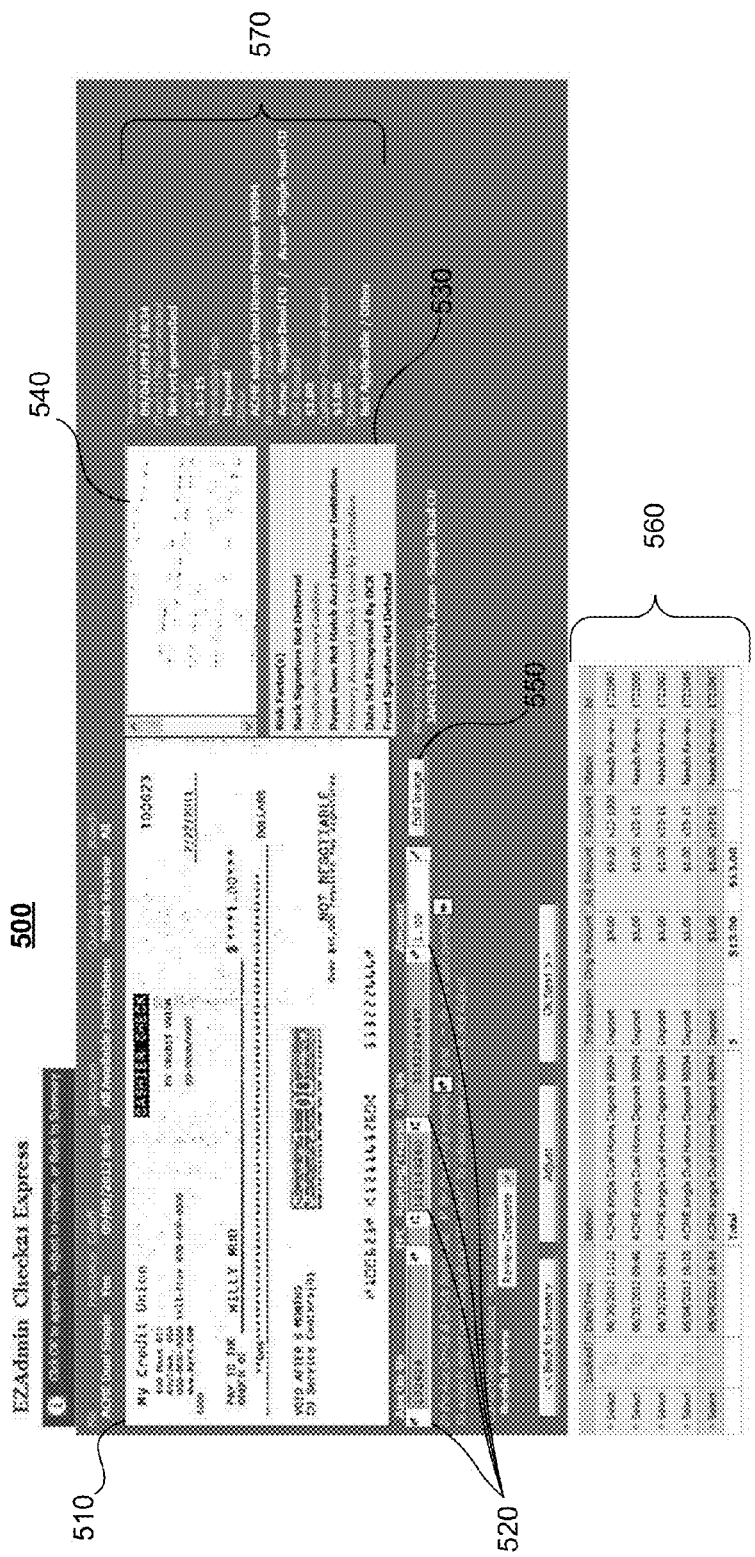
FIGS. 5-18 depicts various exemplary user interfaces that can be used to implement various embodiments of the present invention.

FIG. 5 shows a screenshot of a user interface 500 that can be displayed by various to enable the user to and correct errors in deposit document image data, according to various embodiments of the present invention. As shown graphical user interface 500 can include an image of a check 510. In such embodiments, user interface 500 can be invoked during a troubleshooting session from an associated user support system. User-interface 500 can be invoked in parallel or in conjunction with the troubleshooting session from in-line or contextual controls from within the user support system.

As shown, user interface 500 can also include indications of information 520 gleaned from the image of the check 510. For example, indications 520 can include the check number, routing or transit number, account number, and the amount of the check. User-interface 500 can also include truncated or processed view of the reverse side of the check in window 540. In some embodiments, view 540 can include an image of the signature or endorsements from the back the check. User-interface 500 can also include various other user, account, or remote deposit session specific information 570. As shown, information 570 can include a transaction date and time, the account number, the transaction type, the station designation, acquirer/issuer information, the amount of the check determined by OCR, the amount entered by user or depositor, and the deposit type. User interface 500 can also show the history 570 of various transactions or deposits associated with particular user, account, or financial institution.

Figure 6:
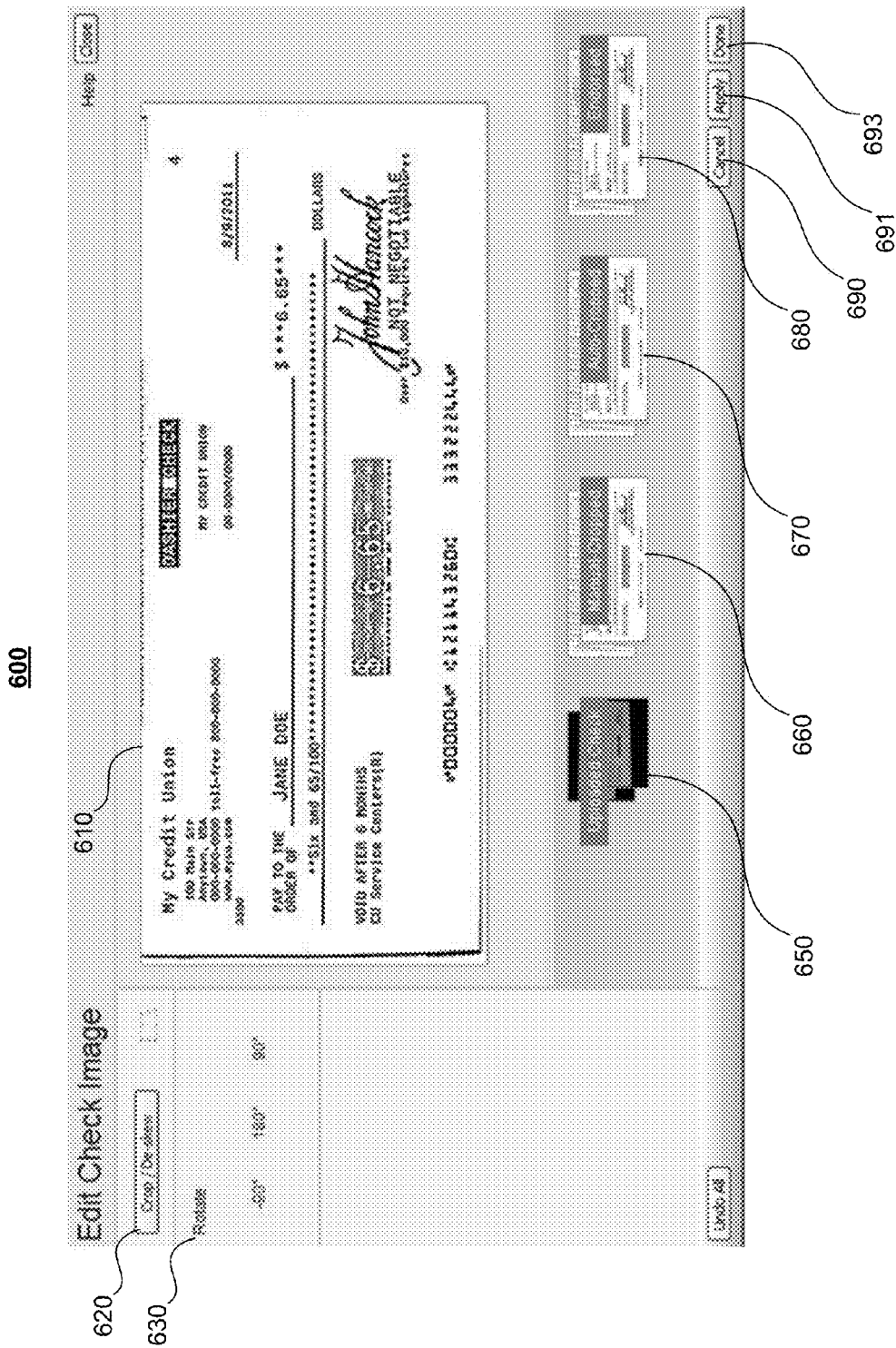

User interface 500 can also include an edit image control button 550. Edit image control button 550 can be used by a user to invoke a deposit document image information verifier or editor. In this particular example, a user may have noticed that various risk factors shown in section 530 indicate that the automated system that initially processed the uploaded deposit document image encountered various errors. For example, the backside of the deposit document may have been submitted upside down, the date may not have been recognized by the OCR sub module, the system duplicated the primary code line, the payee does not match a valid account holder or institution, or the primary account has been black-listed by an institution. Such errors or risk factors may be the result of a poorly aligned or badly imaged deposit document during image capture. For example, when button 550 is clicked, the deposit document image information verifier or editor user interface can be displayed. FIG. 6 illustrates an exemplary user interface 600 of a deposit document image information editor according to various embodiments of the present invention. As shown, deposit document image information editor user interface 600 can include a number of controls and options. For example, deposit document image information editor user interface 600 can include a button to automatically or manually crop or de-skew the check image in section 610. User-interface 600 can also include a section 630 of controls for rotating the orientation of the check image in section 610. According to various embodiment the present invention, the user interface 600 can also include links or controls for displaying related or alternate versions of the check image 610, as shown in controls 650, 660, 670, and 680.

In such embodiments, the controls 650, 660, 670, and 680, can indicate which version of the check image in section 610 is being shown. The specific example shown in user interface 600 shows that control for the uploaded check 650 is darkened to indicate that the check that was uploaded from the user is being shown, as check image in section 610. Control 660 is operable to accept user input to cause the deposit document image information verifier system to display a manually cropped version of the check image in section 610. Similarly, control 670 is operable to accept user input to cause the system to display the auto cropped version of the check. If there is no manually cropped or auto cropped versions of the check, and the versions displayed when control 660 or 670 are operated can cause the system to display the originally uploaded check image as a default. Finally, control 680 can be operable to accept user input to cause system to display the endorsed version of the check image. User-interface 600 can also include standard user interface controls such as controls 690, 691, 693 for canceling, applying and indicating that editing of the check image in section 610 is complete.

Figure 7:
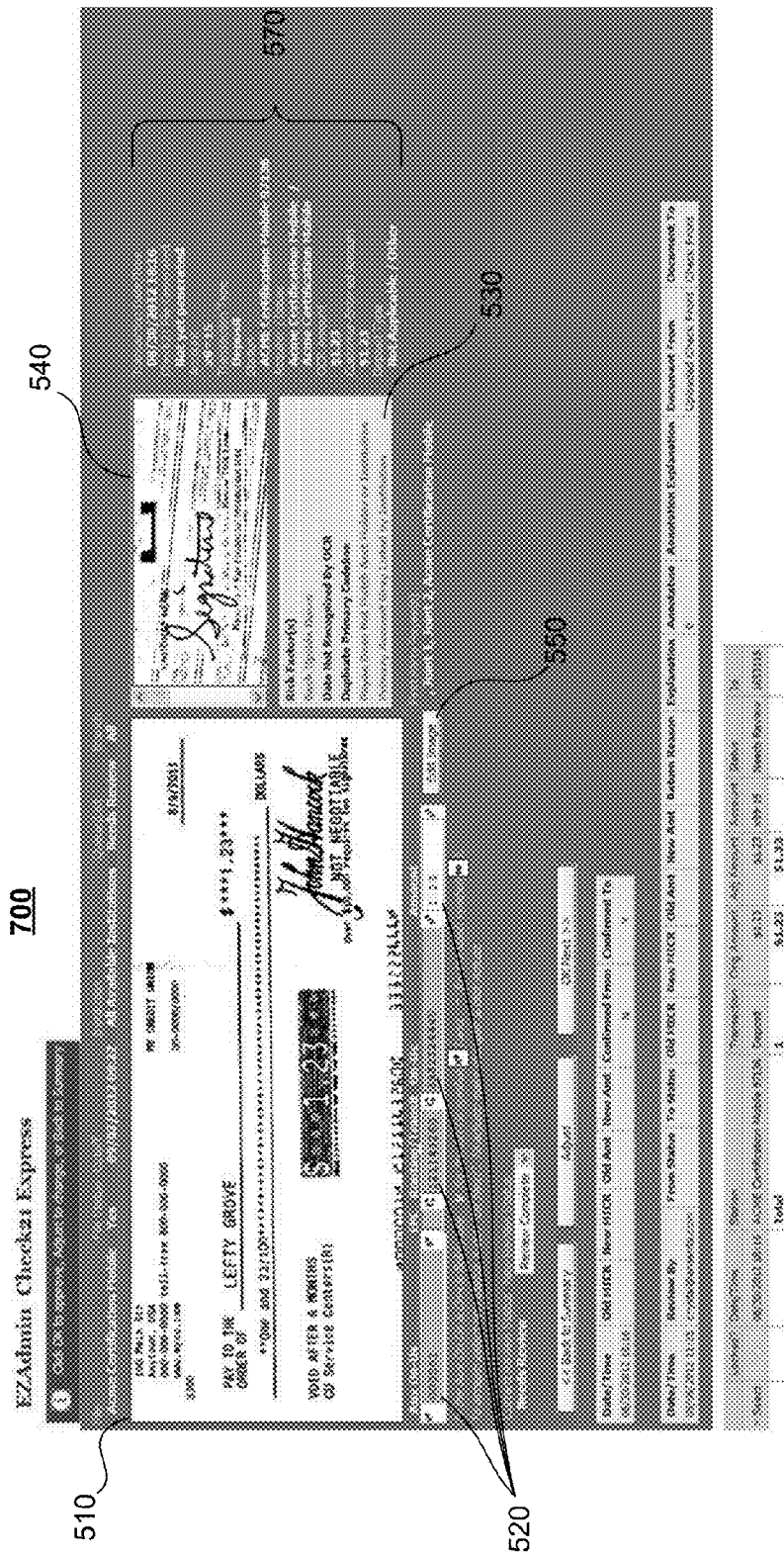
Figure 8:
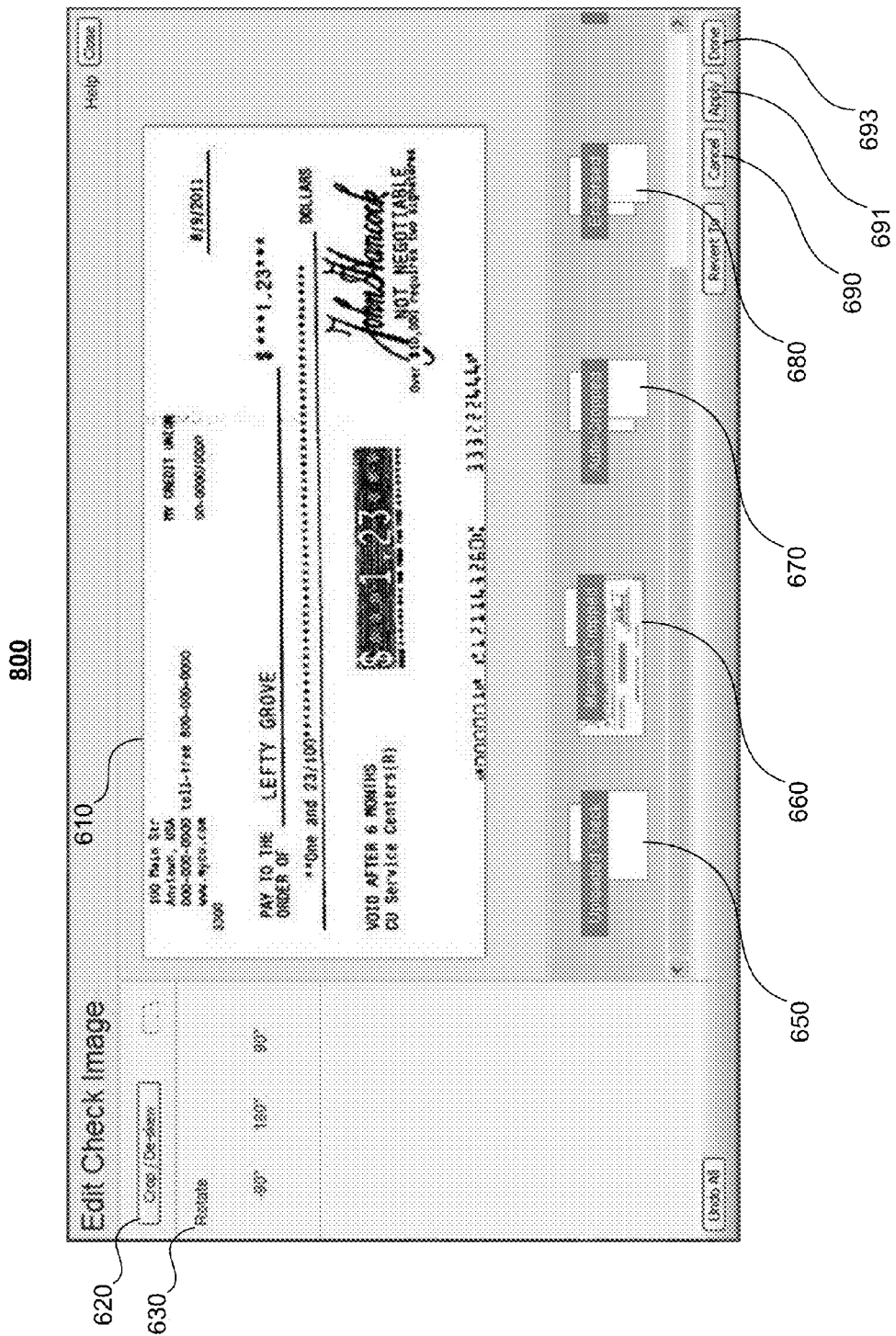

FIG. 7 shows another user interface 700 being used to correct detection of an error in the endorsement signature on the back of deposit document imaged in the deposit document image in section 610. A user can click edit image control 550 to display an edit window with the active image, i.e. deposit document image in section 610. In the exemplary scenario shown, the deposit document image includes an endorsed check. An image editing user interface 800 with an image of the front of the endorsed check in section 610 is shown in FIG. 8. In this particular scenario, the processed version of the deposit document, i.e. the black and white or binarized version of the check, is automatically shown when the user clicks edit image control 550. To go back to the original image received from remote image capture device, a user can click on the uploaded check control 650, as shown in FIG. 9.

Figure 9:
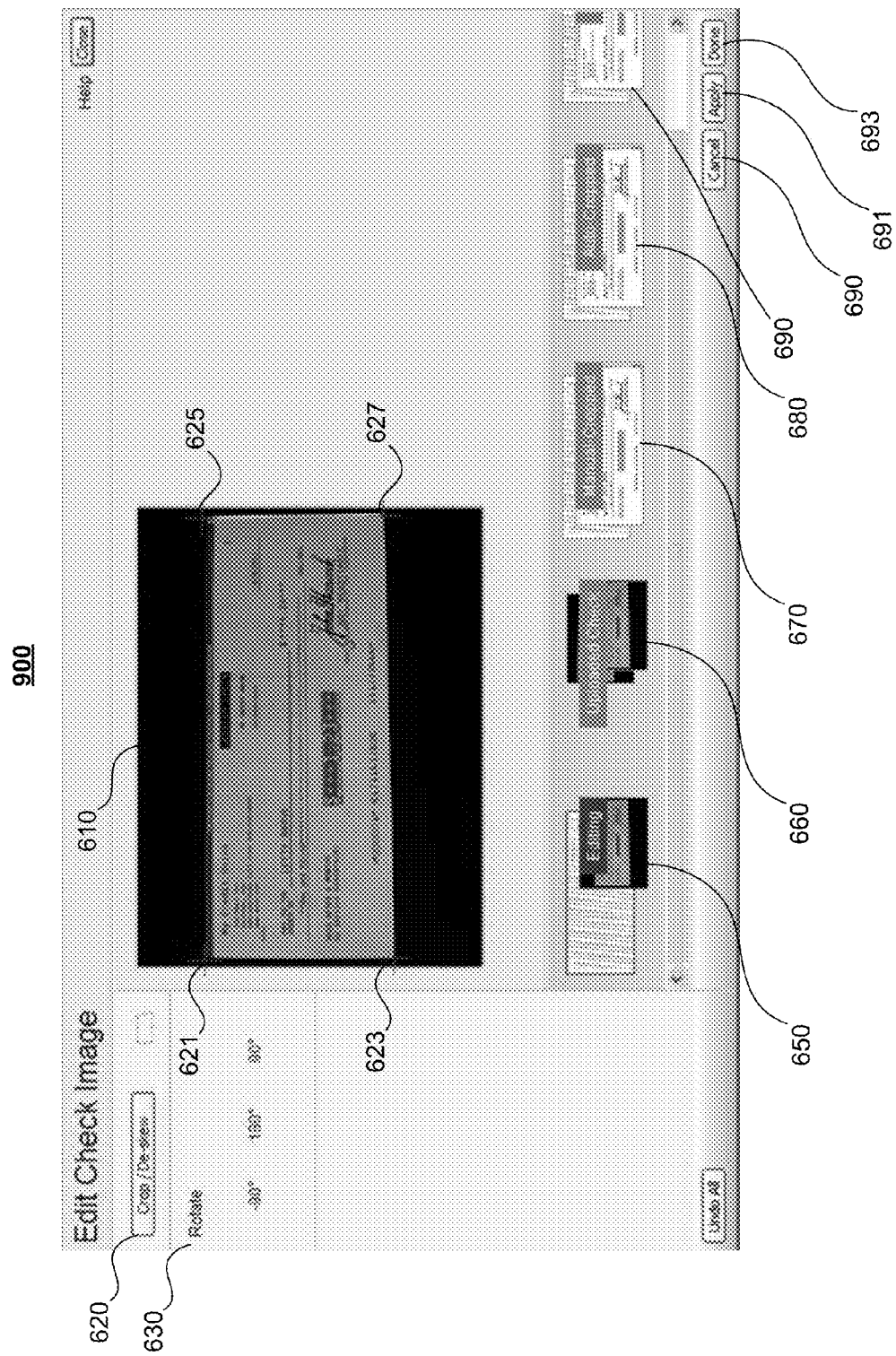
Figure 10:
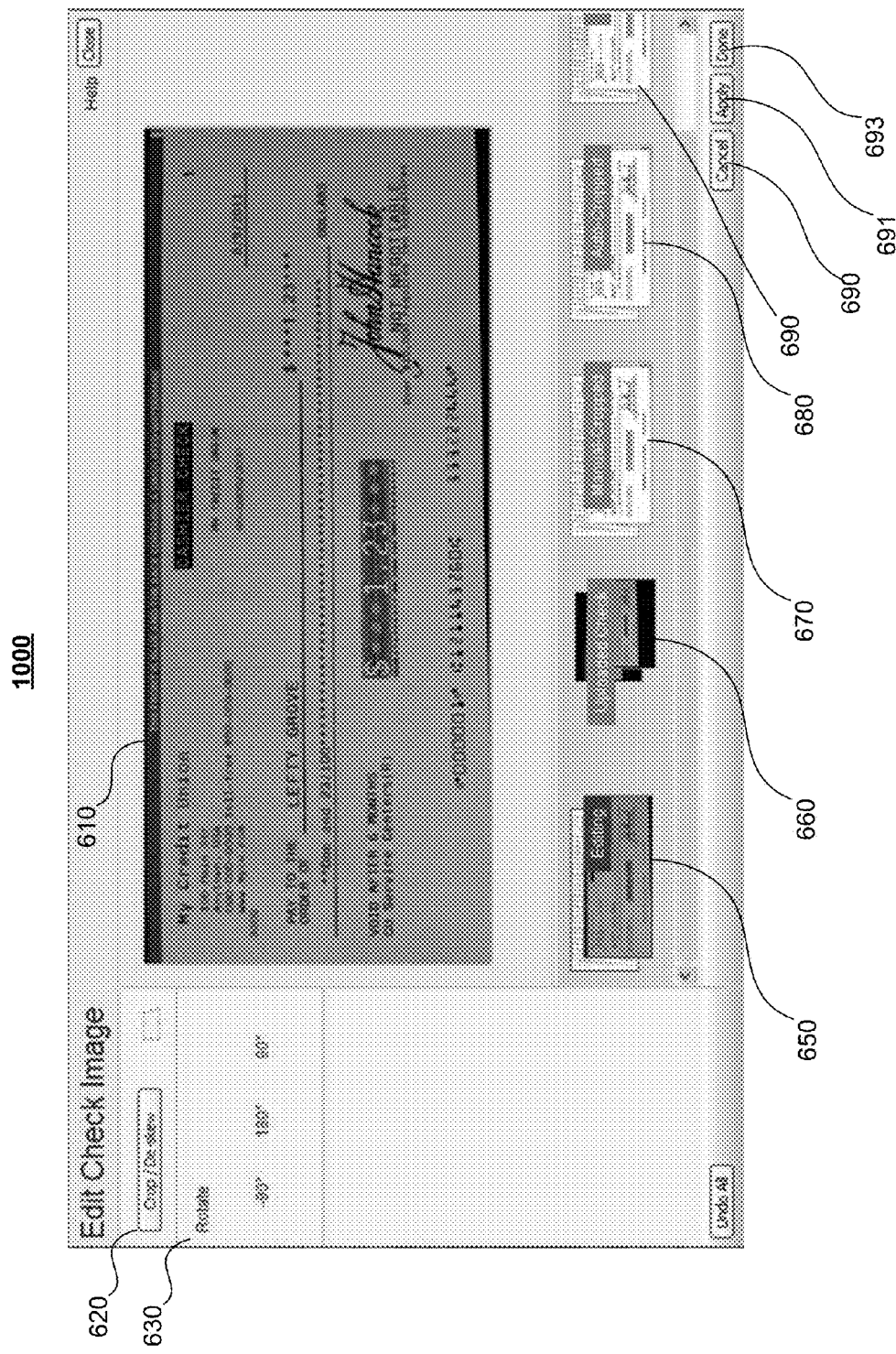

User interface 900 of FIG. 9 shows an image of the original uploaded check image in section 610. In this particular example, the deposit document image data display in section 610 includes a digital photograph of a check. The check shown in section 610 of under interface 900 is not square because the angle between the check and the image capture device was skewed. To de-skew the uploaded deposit document image, the user can click on the crop/de-skew control 620. In some embodiments, the user can manually place crosshairs 621, 623, 625, and 627 at the corners of the original uploaded deposit document image. In other embodiments, an associated internal or external subroutine can automatically place crosshairs 621, 623, 625, and 627 at the corners of the deposit document image in the deposit document image in section 610. The crop/de-skew sub operations can then crop the deposit document image to include only the portions of the image that include the deposit document, i.e. the check. The resulting cropped image of the check is shown in deposit document image section 610 of user interface 1000 in FIG. 10.

Figure 11:
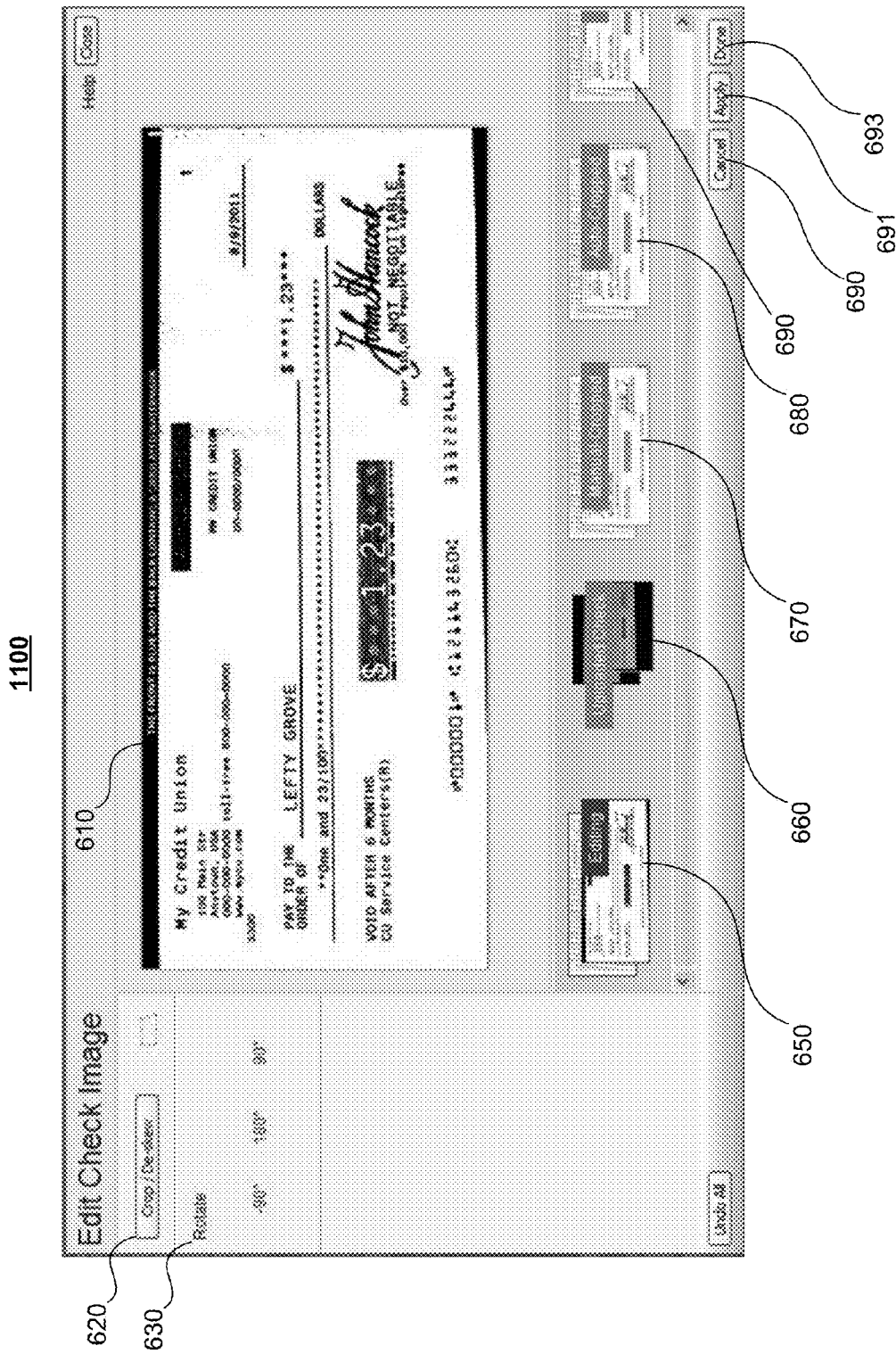

A user can then click the apply control 691, or other appropriately configured control, to convert the cropped image of the check to a binary image of the check in accordance with various ISO standards. The result of the binarization of the cropped check can be displayed in the deposit document image section 610 of user interface 1100 in FIG. 11. If the user is satisfied with the processed binary image in the deposit document image section of user interface 1100, the user can click the done control 693. This causes the image to be cropped and saved. The newly cropped and binarized saved image, shown in image section 610 of user interface 110 of FIG. 11 can then be used to approve and process the deposit represented by the submission of the deposit document, i.e. the check. In related embodiments, the approval of the deposit document can be handled by a financial institution's item or deposit processor.

Figure 12:
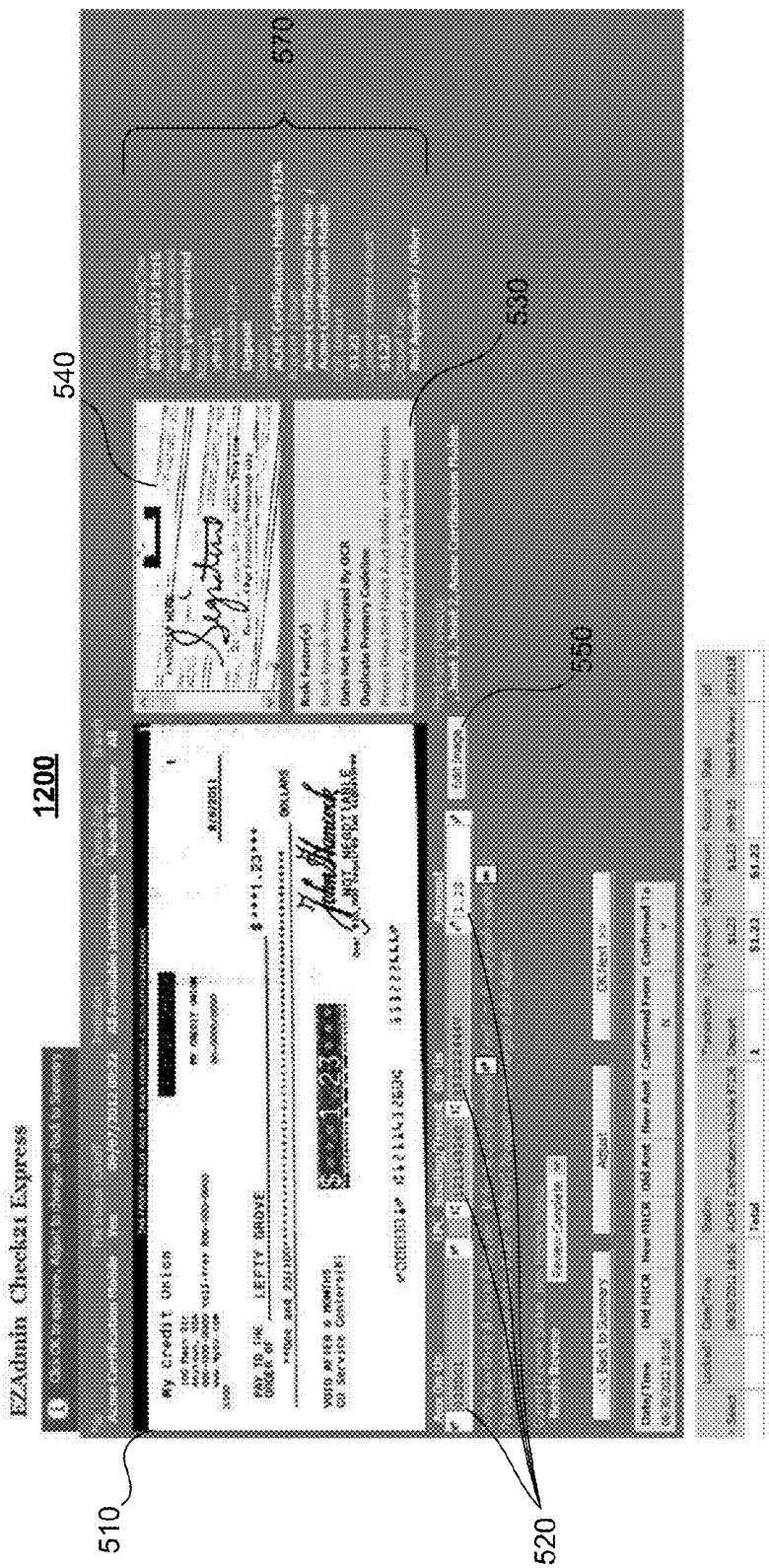
Figure 13:
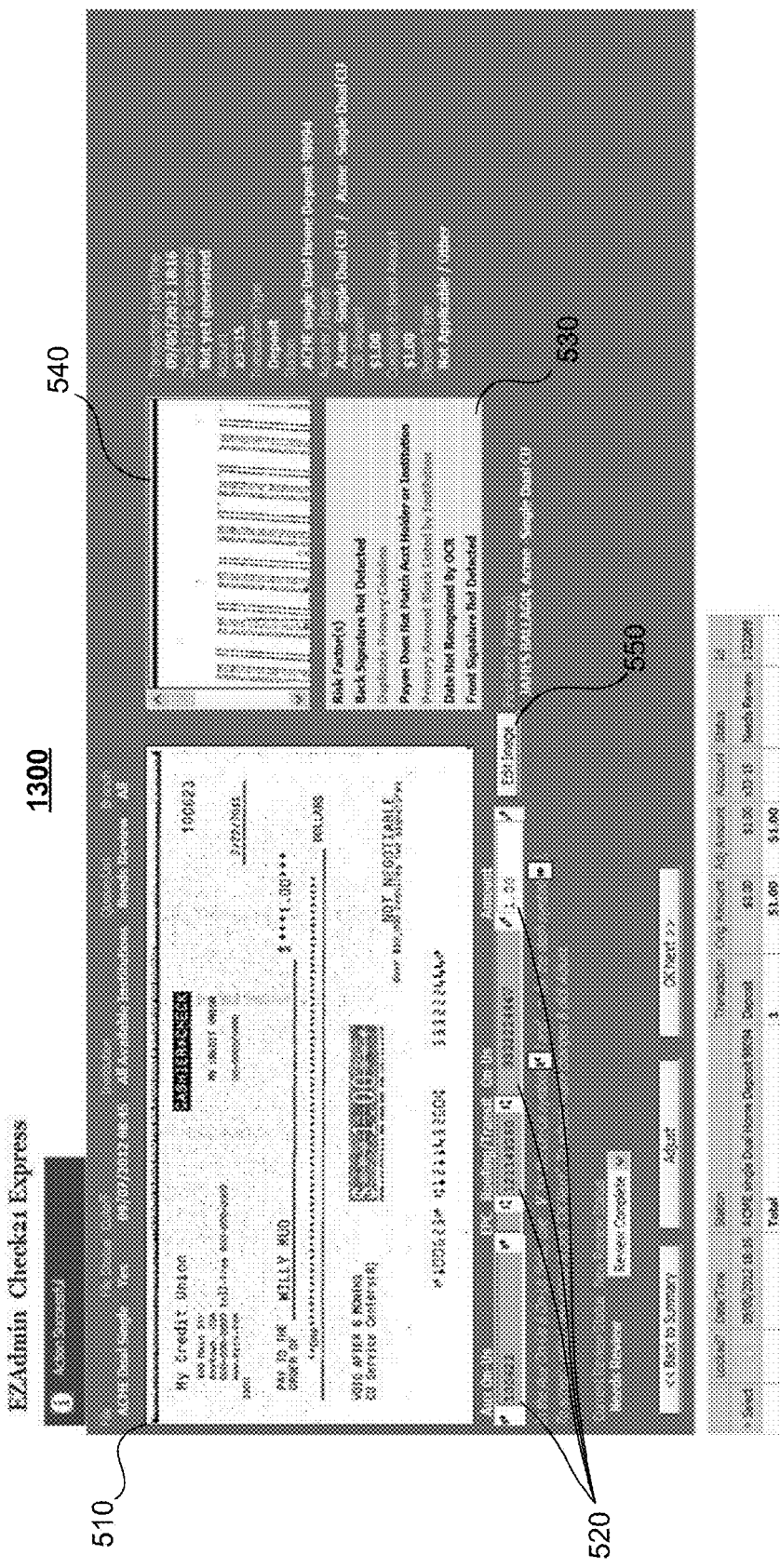
Figure 14:
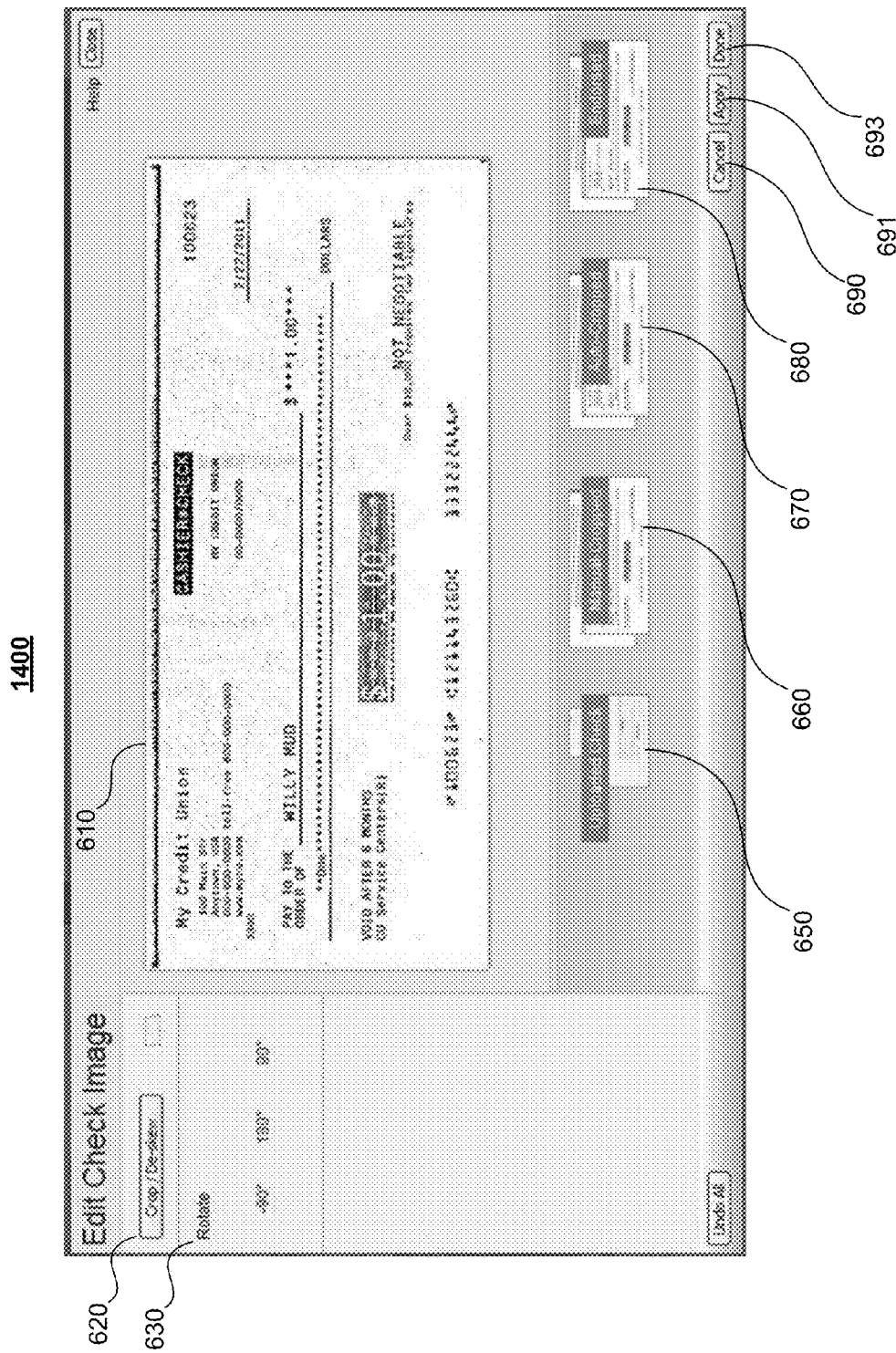
Figure 15:
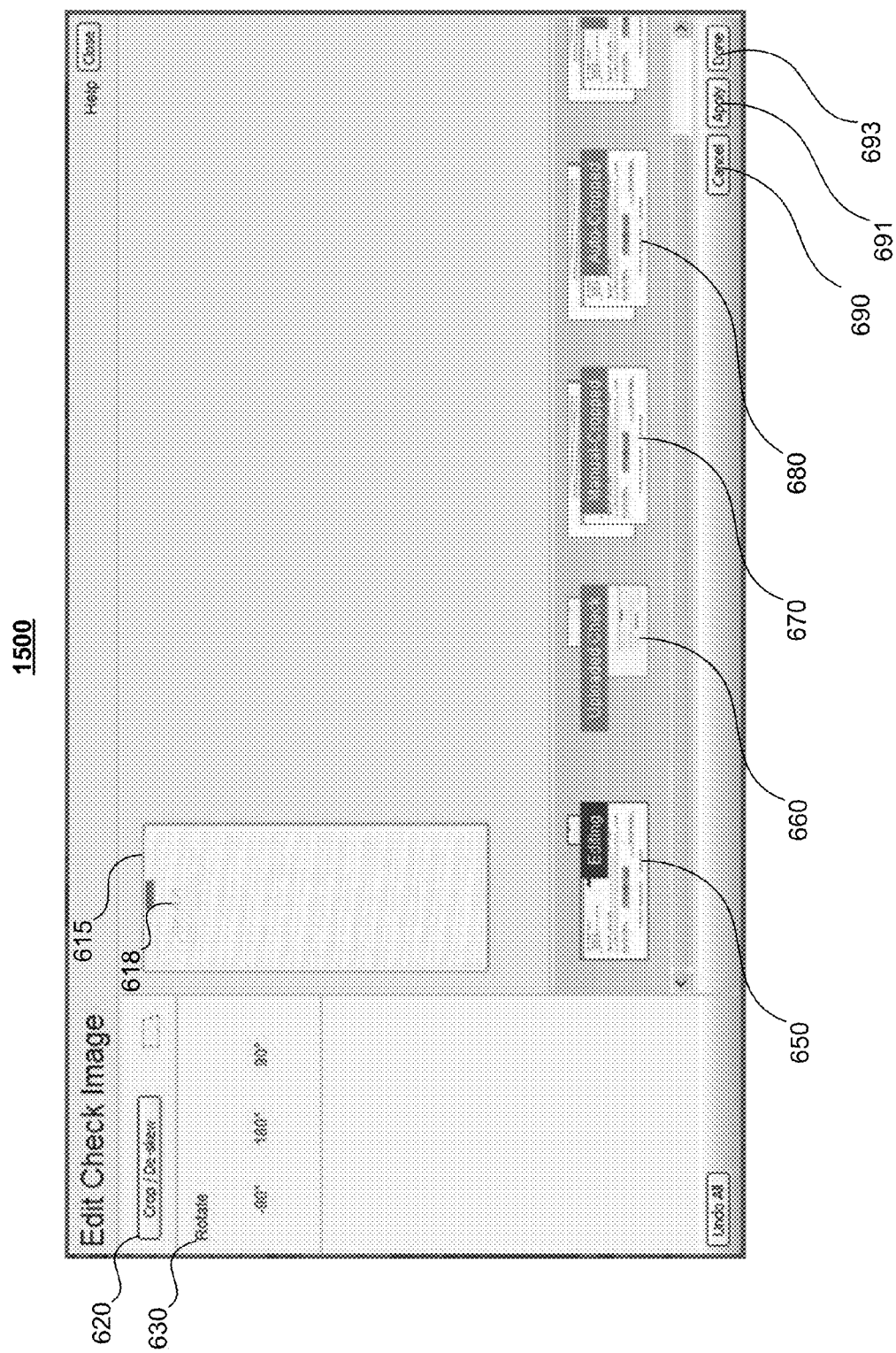
Figure 16:
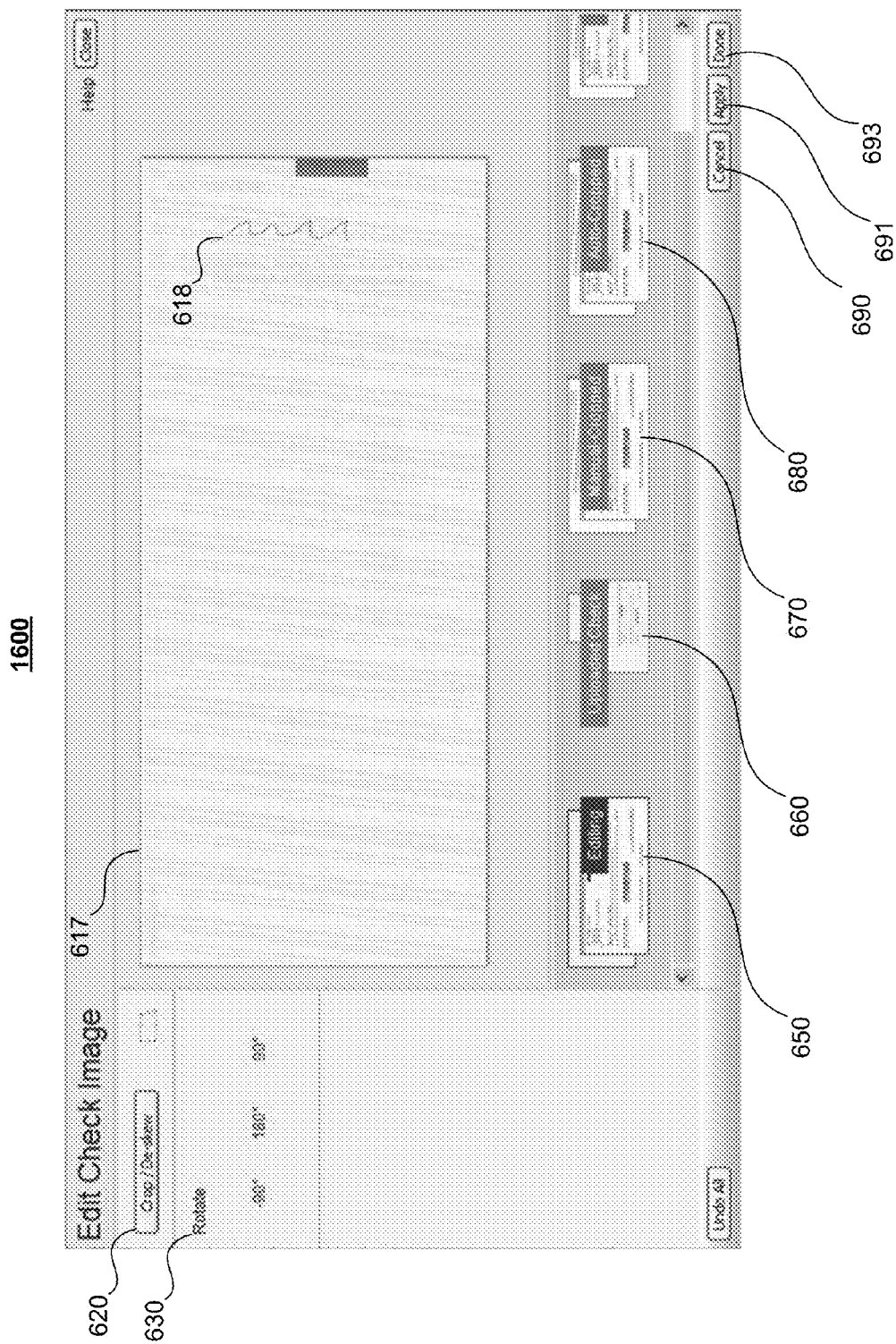
Figure 17:
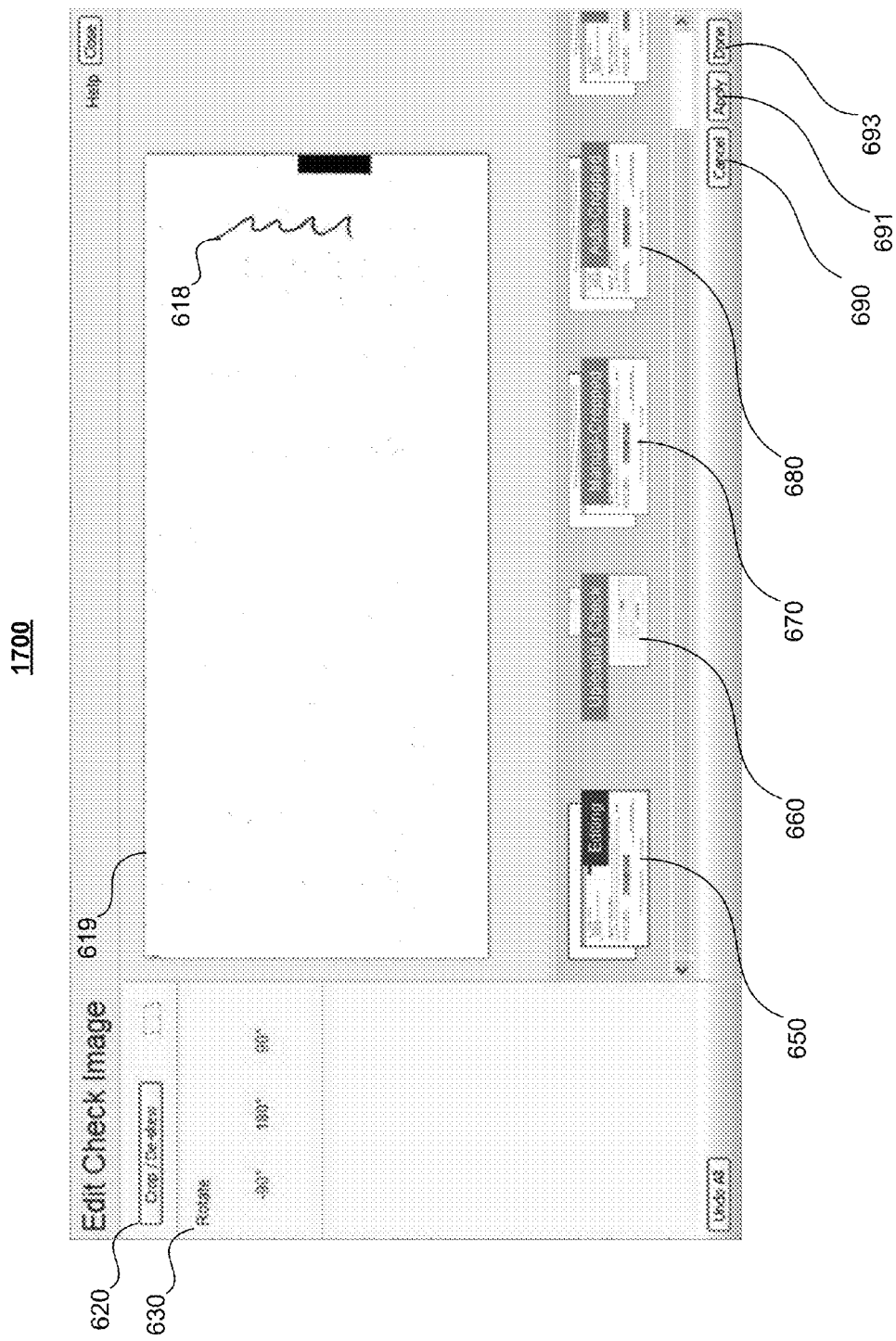
Figure 18:
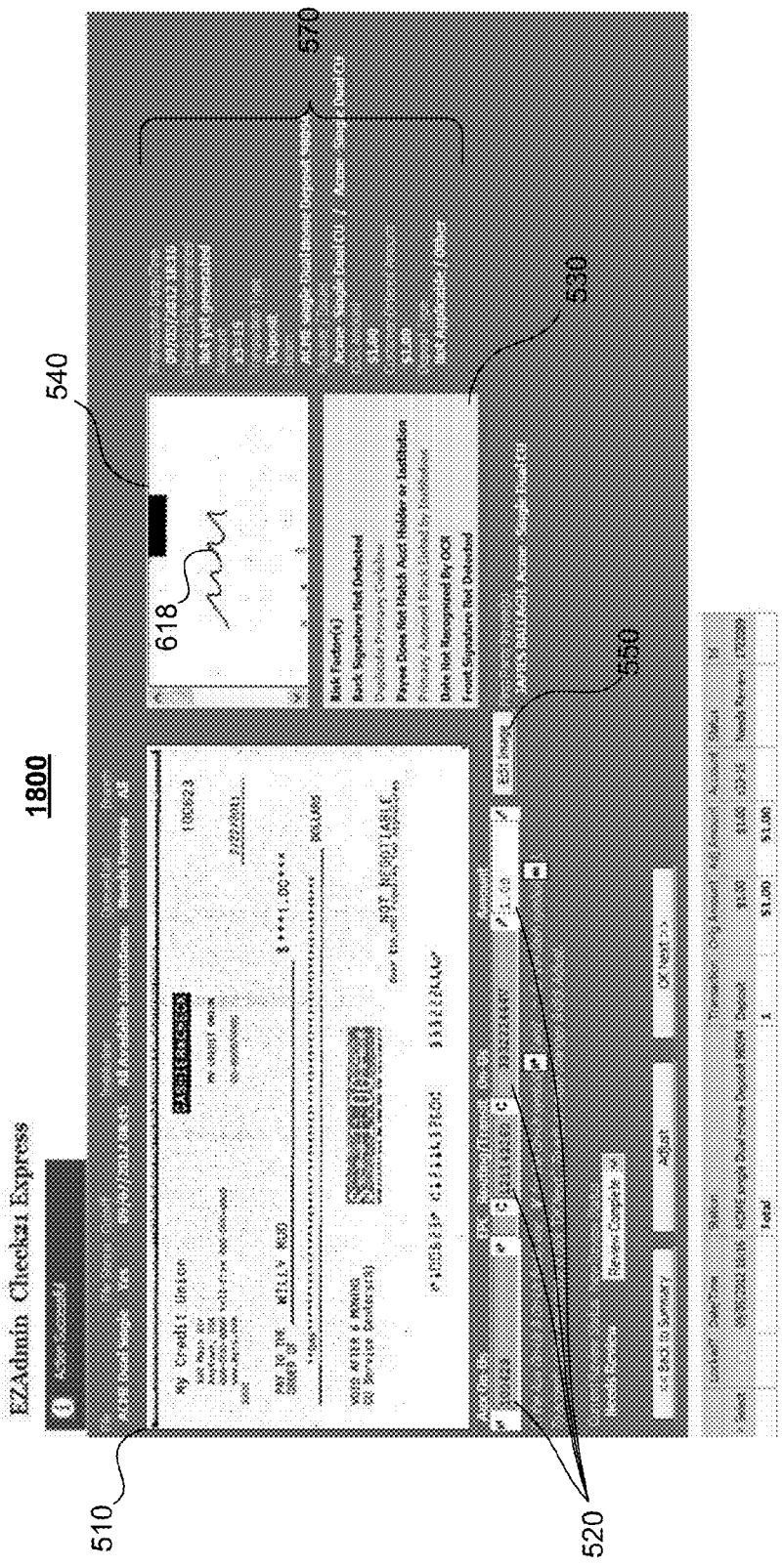

FIG. 12 illustrates an exemplary use case in which one or more errors or risks are detected that would prevent the system to properly process the deposit document. As shown in FIG. 12, the preview window 510 of user-interface 1200 shows in section 530 that the system detected various errors that can be detected and corrected by various embodiments of the present invention. For example, as shown in section 530 of user interface 1200, the system indicated in error/risk section 530 that the back of the deposit document is upside down, the date was not recognized OCR, a duplicate primary codeline was detected, the payee does not match account holder or financial institution, and the primary account has been gray listed by the financial institution.

FIGS. 13 to 18 illustrate exemplary use cases in which one or both sides of a deposit document image need to be rotated in order for one or more systems to properly process the deposit document. As shown in user interface 1300 of FIG. 13, error/risk section 530 indicates the system failed to identify or locate an endorsement signature in the image of the back of deposit document shown in section 510. To correct this a user can click the edit image control 550 to invoke the deposit document image editor 1400 shown in FIG. 14. Control 650 of user interface 1400 can include two regions to display the front or back of a particular version of the deposit document. In related embodiments, the control indicating the active image of the subject deposit document can be operated or clicked multiple times to display an image of the reverse side of the deposit document shown in user interface 1400. The image of a reverse side of the deposit document can be shown as uploaded, for example the image of the reverse side of the check 615 that includes a grayscale version of the endorsement signature 618 can can be displayed in user interface 1500 of FIG. 15. A user can click one or more of the controls in rotate control section 630 one or more times to rotate the image 615 into the desired orientation, such as that shown in image 617 of user interface 1600 of FIG. 16 in which the signature 618 is on the right side of the image. The image 617 can then be binarized to convert the gray scale or color version of the deposit document with signature 618 as uploaded to a black-and-white version of the reverse side of the deposit document, as shown in image 619 of user interface 1700 of FIG. 17. Once the signature 618 is properly oriented and binarized, the check image editor can save and/or pass the process image onto other component or system to complete processing of the remote deposit and the editor can be closed and the user interface 1800 of FIG. 18 can be opened or revealed to complete various tasks and procedure. For example, a support technician can conclude a troubleshooting session and initiate procedures to complete the remote deposit.

Figure 19:
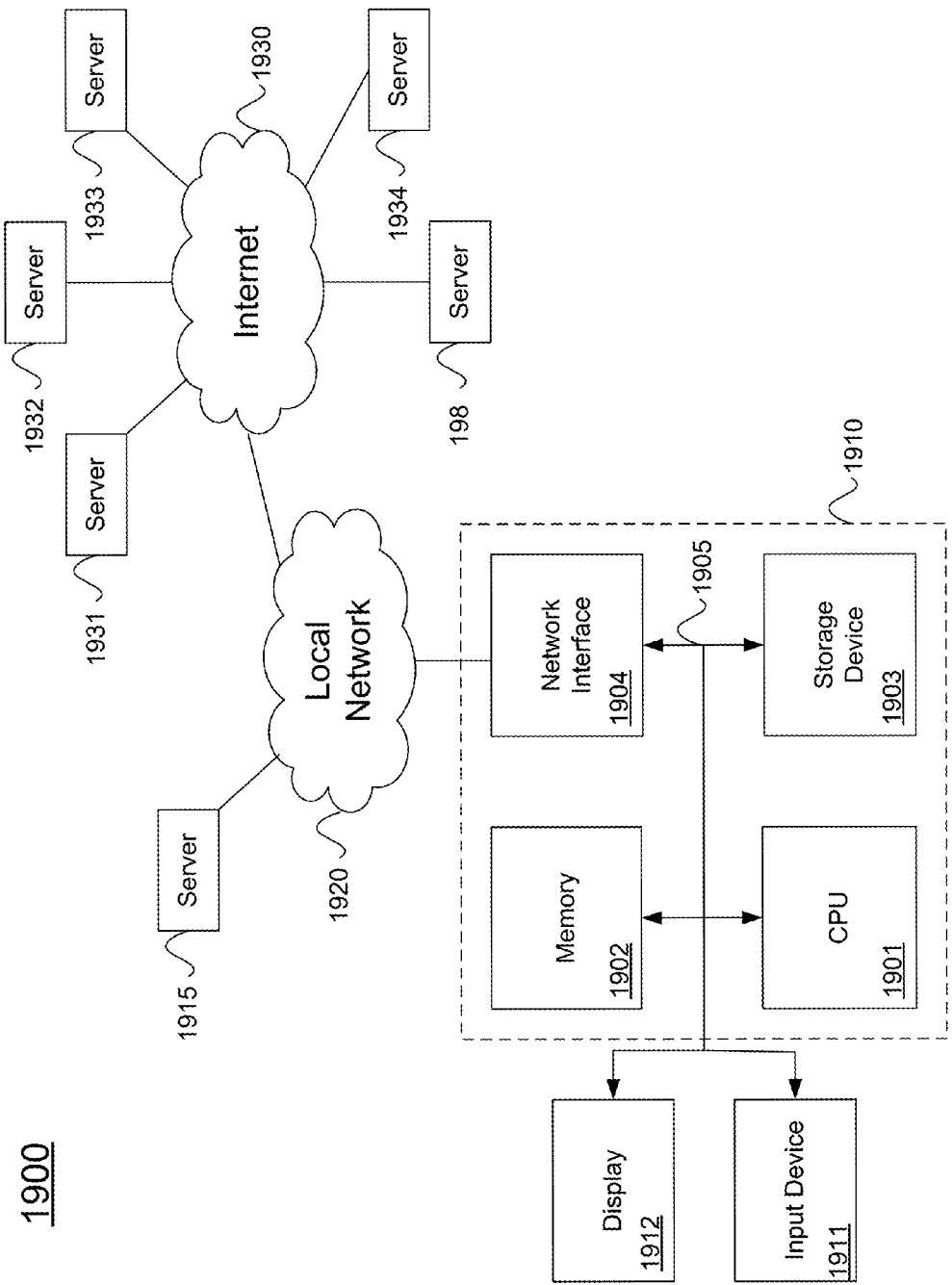
FIG. 19 depicts a simplified schematic of a computer system that can be used to implement various embodiments of the present invention.

FIG. 19 illustrates an example computer system and networks that may be used to implement embodiments of the present invention. Computer system 1910 can include a bus 1905 or other communication mechanism for communicating information, and a processor 1901 coupled with bus 1905 for processing information. Computer system 1910 also includes a memory 1902 coupled to bus 1905 for storing information and instructions to be executed by processor 1901, including instructions for performing the techniques described above. This memory may also be used for storing temporary variables or other intermediate information during execution of instructions to be executed by processor 1901. Possible implementations of this memory may be, but are not limited to, random access memory (RAM), read only memory (ROM), or both. A storage device 1903 is also provided for storing information and instructions. The information instructions can be in the form of computer readable code stored on the storage device, accessible and executable by processor to implement various techniques and methods of the present disclosure. Common forms of storage devices include non-transitory computer readable media, for example, a hard drive, a magnetic disk, an optical disk, a CD, a DVD, a flash memory, a USB memory card, or any other medium from which a computer can read.

Computer system 1910 may be coupled via the same or different information bus, such as bus 1905, to a display 1912, such as a cathode ray tube (CRT) or liquid crystal display (LCD), for displaying information to a computer user. An input device 1911 such as a keyboard and/or mouse is coupled to a bus for communicating information and command selections from the user to processor 1901. The combination of these components allows the user to communicate with the system.

Computer system 1910 also includes a network interface 1904 coupled with bus 1905. Network interface 1904 may provide two-way data communication between computer system 1910 and the local network 1920. The network interface 1904 may be a digital subscriber line (DSL) or a modem to provide data communication connection over a telephone line, for example. Another example of the network interface is a local area network (LAN) card to provide a data communication connection to a compatible LAN. Wireless links, such as IEEE 802.11xx, WiFi, WiMAX, and other wireless electronic communication protocol are other examples. In any such implementation, network interface 1904 sends and receives electrical, electromagnetic, or optical signals that carry digital data streams representing various types of information.

Computer system 1910 can send and receive information, including messages or other interface actions, through the network interface 1904 to an Intranet or the Internet 1930. In the Internet example, software components or services may reside on multiple different computer systems 1910 or servers 1931 across the network. Software components described above may be implemented on one or more servers. A server 1931 may transmit messages from one component, through Internet 1930, local network 1920, and network interface 1904 to a component or container on computer system 1910, for example. Software components of a composite application may be implemented on the same system as other components, or on a different machine than other software components. This process of sending and receiving information between software components or one or more containers may be applied to communication between computer system 1910 and any of the servers 1931 to 1935 in either direction. It may also be applied to communication between any two servers 1931 to 1935.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
   receiving, in a computer system, a request for data associated with a particular remote deposit session from a user during a troubleshooting session;
   retrieving, in the computer system, in response to the request, remote deposit session data associated with the particular remote deposit session from a data store;
   displaying, on a display device of the computer system, a first user interface comprising the remote deposit session data and embedded controls;
   receiving, in the computer system, through the embedded controls, a request for a deposit document image associated with the remote deposit session data;
   retrieving, in the computer system, in response to the request for the deposit document image, deposit document image data from the data store;
   displaying, on the display device, the deposit document image based on the deposit document image data in a second user interface, wherein the second user interface comprises image editing controls;

editing, in the computer system, in response to input received through the image editing controls, the deposit document image to create an edited deposit document image;

saving the edited deposit document image as edited deposit document image data to the data store; and processing, in the computer system, the edited deposit document image data.

2. The method of claim 1 wherein the deposit document image data comprises data received from a remote capture device during the remote deposit session.

3. The method of claim 1 wherein the deposit document image data comprises an error that prevents completion of the remote deposit session.

4. The method of claim 1 wherein processing the edited deposit document image data comprises determining deposit information from the edited deposit document image data.

5. The method of claim 4 wherein determining deposit information from the edited deposit document image data comprises performing an optical character recognition (OCR) function on the edited deposit document image data.

6. The method of claim 1 wherein the second user interface further comprises controls for accessing a related deposit document image associated with the remote deposit session data.

7. A method of claim 6 wherein the deposit document image comprises an image of a first side of a deposit document associated with the particular remote deposit session or a second side of the deposit document.

8. A non-transitory computer readable medium comprising:

computer readable code that when executed on a processor of a computer system causes the processor to receive a request for data associated with a particular remote deposit session from a user during a troubleshooting session, retrieve, in response to the request, remote deposit session data associated with the particular remote deposit session from a data store, display, on a display device of the computer system, a first user interface comprising the remote deposit session data and embedded controls, receive, through the embedded controls, a request for a deposit document image associated with the remote deposit session data, retrieve, in response to the request for the deposit document image, deposit document image data from the data store, display, on the display device, the deposit document image based on the deposit document image data in a second user interface, wherein the second user interface comprises image editing controls, editing, in response to input received through the image editing controls, the deposit document image to create an edited deposit document image, save the edited deposit document image as edited deposit document image data to the data store, and process, the edited deposit document image data, in the computer system, in response to embedded controls of the first user interface.

9. The non-transitory computer readable medium of claim 8 wherein the deposit document image data comprises data received from a remote capture device during the remote deposit session.

10. The non-transitory computer readable medium of claim 8 wherein the deposit document image data comprises an error that prevents completion of the remote deposit session.

11. The non-transitory computer readable medium of claim 8 wherein the computer readable code that causes the processor to process the edited deposit document image data further comprises computer readable code to cause the processor to determine deposit information from the edited deposit document image data.

12. The non-transitory computer readable medium of claim 11 wherein the computer readable code that causes the processor to determine deposit information from the edited deposit document image data comprises computer readable code that causes the processor to perform an optical character recognition (OCR) function on the edited deposit document image data.

13. The non-transitory computer readable medium of claim 8 wherein the second user interface further comprises controls for accessing a related deposit document image associated with the remote deposit session data.

14. The non-transitory computer readable medium of claim 13 wherein the related deposit document image comprises an image of a first side of a deposit document associated with the particular remote deposit session or a second side of the deposit document.

15. A system comprising:
a deposit data verifier;
a deposit image editor coupled to deposit data verifier; and
a deposit event data store coupled to the deposit data verifier and the deposit image editor,
wherein the deposit data verifier receives a request for data associated with a particular remote deposit session from a user during a troubleshooting session, retrieves, in response to the request, remote deposit session data associated with the particular remote deposit session from a deposit event data store, displays, on a display device, a first user interface comprising the remote deposit session data and embedded controls, receives, through the embedded controls, a request for a deposit document image associated with the remote deposit session data, retrieves, in response to the request for the deposit document image, deposit document image data from the deposit event data store, and displays, on the display device, the deposit document image based on the deposit document image data in a second user interface,
wherein the second user interface comprises image editing controls, and
wherein the deposit image editor, in response to input received through the image editing controls, edits the deposit document image to create an edited deposit document image, saves the edited deposit document image as edited deposit document image data to the deposit event data store,
wherein the deposit data verifier processes the edited deposit document image data, in response to embedded controls of the first user interface.

16. The system of claim 15 wherein the deposit document image data comprises data received from a remote capture device during the remote deposit session.

17. The system of claim 15 wherein the deposit document image data comprises an error that prevents completion of the remote deposit session.

18. The system of claim 15 wherein the deposit data verifier determines deposit information from the edited deposit document image data.

19. The system of claim 15 wherein the second user interface further comprises controls for accessing a related deposit document image associated with the remote deposit session data.

20. A system of claim 19 wherein the related deposit document image comprises an image of a first side of a deposit document associated with the particular remote deposit session or a second side of the deposit document.

* * * * *